(12) United States Patent
Shtilerman et al.

(10) Patent No.: US 10,292,398 B2
(45) Date of Patent: May 21, 2019

(54) TRIANGULAR FOOD PRODUCT FOLDING APPARATUS

(71) Applicant: Solbern Inc., Fairfield, NJ (US)

(72) Inventors: Moysey Shtilerman, Elmwood Park, NJ (US); Ryan Timothy Ragoza, Westfield, NJ (US); Robert Wall, Mahwah, NJ (US)

(73) Assignee: Solbern Inc., Fairfield, NJ (US)

( * ) Notice: Subject to any disclaimer, the term of this patent is extended or adjusted under 35 U.S.C. 154(b) by 11 days.

(21) Appl. No.: 15/615,145

(22) Filed: Jun. 6, 2017

(65) Prior Publication Data

US 2017/0347668 A1 Dec. 7, 2017

Related U.S. Application Data

(60) Provisional application No. 62/346,661, filed on Jun. 7, 2016.

(51) Int. Cl.
*A21C 9/06* (2006.01)
*A21C 1/14* (2006.01)
*A21C 9/08* (2006.01)
*A21C 14/00* (2006.01)

(52) U.S. Cl.
CPC ............ *A21C 9/063* (2013.01); *A21C 1/1445* (2013.01); *A21C 9/088* (2013.01); *A21C 14/00* (2013.01)

(58) Field of Classification Search
CPC ....... A21C 1/1445; A21C 9/088; A21C 14/00; A21C 9/063
USPC ........... 99/450.1, 450.2, 450.3, 450.4, 450.5, 99/450.6, 450.7, 450.8, 352, 353, 354, 99/355, 494; 53/209, 211; 425/113, 296, 425/297, 308, 324.1, 334, 340, 383, 394, 425/403, 396, 397; 414/137, 468.4
See application file for complete search history.

(56) References Cited

U.S. PATENT DOCUMENTS

| 1,891,845 | A |   | 12/1932 | Spitz et al. |            |
|-----------|---|---|---------|--------------|------------|
| 2,107,749 | A |   | 2/1938  | Curtis       |            |
| 2,256,044 | A |   | 9/1941  | Keathley et al. |         |
| 2,574,548 | A | * | 11/1951 | Deutsch ................... | A21C 3/00 |
|           |   |   |         |              | 425/334    |

(Continued)

FOREIGN PATENT DOCUMENTS

| FR | 2870677 A1    | 12/2005 |
|----|---------------|---------|
| GB | 191316569 A   | 7/1914  |

(Continued)

OTHER PUBLICATIONS

Great Britain Combined Search and Examination Report for Application No. GB1709806.2 dated Dec. 14, 2017.

(Continued)

*Primary Examiner* — Jimmy Chou
(74) *Attorney, Agent, or Firm* — McCarter & English, LLP

(57) ABSTRACT

Exemplary embodiments are directed to a food product folding apparatus for forming a triangular food product, generally including a folding section, and first, second, third and fourth actuator mechanisms. The folding section includes, first, second, third and fourth folding platforms. The first, second, third and fourth actuator mechanisms are configured to actuate rotation of respective first, second, third and fourth folding platforms into first, second, third and fourth fold positions to create first, second, third and fourth folds in the food product.

39 Claims, 36 Drawing Sheets

(56) References Cited

U.S. PATENT DOCUMENTS

| | | | |
|---|---|---|---|
| 2,855,867 A | 10/1958 | Zeitlin | |
| 2,969,025 A * | 1/1961 | Schafer | A21C 9/063 99/450.1 |
| 3,356,044 A | 12/1967 | Keathley et al. | |
| 3,653,337 A * | 4/1972 | Hanson | A47J 37/1295 425/394 |
| 3,669,007 A | 6/1972 | Pulici | |
| 3,690,248 A * | 9/1972 | Schafer | A21C 9/063 99/450.1 |
| 3,716,962 A * | 2/1973 | Langen | B65B 7/20 493/180 |
| 3,745,911 A | 7/1973 | Kennedy, Jr. et al. | |
| 3,782,271 A | 1/1974 | Tobey et al. | |
| 3,894,829 A * | 7/1975 | Brunner | A21C 15/02 425/383 |
| 3,912,433 A * | 10/1975 | Ma | A21C 9/04 425/126.1 |
| 3,920,440 A | 11/1975 | Takaoka et al. | |
| 4,084,493 A | 4/1978 | Quintana | |
| 4,193,373 A | 3/1980 | Hanson, Jr. et al. | |
| 4,342,182 A * | 8/1982 | Dennis | B65B 25/065 493/407 |
| 4,388,059 A | 6/1983 | Ma | |
| 4,393,758 A | 7/1983 | Anmahian | |
| 4,439,124 A * | 3/1984 | Watanabe | A21C 9/063 425/112 |
| 4,457,225 A | 7/1984 | Bakker | |
| 4,483,242 A | 11/1984 | Goodman et al. | |
| 4,516,487 A | 5/1985 | Madison et al. | |
| 4,608,919 A | 9/1986 | Prows et al. | |
| 4,638,729 A | 1/1987 | Woodworth et al. | |
| 4,651,635 A * | 3/1987 | Ally | A21C 9/063 425/113 |
| 4,691,627 A | 9/1987 | Roberts | |
| 4,913,043 A | 4/1990 | Cheung | |
| 4,938,981 A | 7/1990 | Hee | |
| 4,961,948 A | 10/1990 | Hee | |
| 5,012,726 A * | 5/1991 | Fehr | A21C 9/063 99/450.6 |
| 5,085,138 A | 2/1992 | Fehr et al. | |
| 5,143,735 A * | 9/1992 | Varvello | A21C 3/06 425/220 |
| 5,190,780 A * | 3/1993 | Fehr | A21C 9/063 426/283 |
| 5,263,407 A * | 11/1993 | Pomara, Jr. | A23P 20/20 99/450.6 |
| 5,268,188 A | 12/1993 | Diem et al. | |
| 5,289,761 A | 3/1994 | Spierts et al. | |
| 5,405,256 A * | 4/1995 | Dalton | A21C 9/063 425/112 |
| 5,417,996 A * | 5/1995 | Brink | A21C 9/063 425/343 |
| 5,445,840 A * | 8/1995 | Wadell | A21C 9/063 425/383 |
| 5,448,943 A * | 9/1995 | Milohanic | A21C 9/063 99/450.1 |
| 5,551,333 A * | 9/1996 | Goto | A21C 9/063 99/353 |
| 5,580,599 A * | 12/1996 | Fehr | A21C 3/08 198/418.6 |
| 5,699,655 A * | 12/1997 | Kuboyama | B65B 25/001 53/116 |
| 5,912,035 A | 6/1999 | Grat | |
| 6,170,391 B1 * | 1/2001 | Pomara, Jr. | A21C 9/063 99/450.1 |
| 7,487,718 B2 * | 2/2009 | Foulon, Jr. | A21C 9/063 426/502 |
| 8,291,815 B2 | 10/2012 | Lin | |
| 9,504,260 B2 * | 11/2016 | Walz | A21C 15/00 |
| 2006/0078838 A1 | 4/2006 | McLemore | |
| 2006/0107846 A1 | 5/2006 | Foulon et al. | |
| 2006/0144254 A1 * | 7/2006 | Foulon, Jr. | A21C 9/063 99/450.4 |
| 2012/0152130 A1 * | 6/2012 | Robert | A21C 9/063 99/450.7 |
| 2012/0156347 A1 * | 6/2012 | Perlin | A21C 9/063 426/502 |
| 2014/0087041 A1 * | 3/2014 | Alley | A21C 15/007 426/391 |
| 2015/0017288 A1 * | 1/2015 | Lo Faro | A47J 31/407 426/112 |
| 2015/0075390 A1 * | 3/2015 | Walz | A21C 15/00 99/450.2 |
| 2015/0128817 A1 * | 5/2015 | Berger | A21C 15/007 99/450.6 |
| 2015/0135973 A1 * | 5/2015 | Pul | A21C 9/063 99/450.6 |
| 2017/0347668 A1 * | 12/2017 | Shtilerman | A21C 1/1445 |

FOREIGN PATENT DOCUMENTS

| | | |
|---|---|---|
| GB | 2146574 A | 4/1985 |
| JP | 2002125636 A | 5/2002 |

OTHER PUBLICATIONS

Great Britain Examination Report in connection with Application No. GB1709806.2 dated Jun. 1, 2018 (1 page).

International Search Report of the International Searching Authority dated Sep. 1, 2017, issued in connection with International Application No. PCT/U2017/36126 (3 pages).

Written Opinion of the International Searching Authority dated Sep. 1, 2017, issued in connection with International Application No. PCT/US2017/36126 (5 pages).

International Search Report dated Feb. 18, 2015, issued in connection with International Application No. PCT/US14/55310 (4 pages).

Written Opinion of the International Searching Authority dated Feb. 18, 2015, issued in connection with International Application No. PCT/US14/55310 (5 pages).

International Search Report dated Feb. 11, 2015, issued in connection with International Application No. PCT/US2014/064633 (2 pages).

Written Opinion of the International Searching Authority dated Feb. 11, 2015, issued in connection with International Application No. PCT/US2014/064633 (7 pages).

U.S. Appl. No. 14/536,131, filed Nov. 7, 2014, Food Folding Platform and Components Therefor (66 pages).

PCT International Patent Application No. PCT/US2014/064633 filed Nov. 7, 2014, Food Folding Platform and Components Therefor (65 pages).

PCT International Patent Application No. PCT/US14/55310 filed Sep. 12, 2014, Multi-Stage Rotary Food Product Folder (94 pages).

U.S. Appl. No. 14/029,512, filed Sep. 17, 2013, Multi-Stage Rotary Food Product Folder (92 pages).

Response to the Dec. 14, 2017 United Kingdom Combined Search and Examination Report in connection with Application No. GB1709806.2 as filed with the Intellectual Property Office of the United Kingdom dated Feb. 1, 2018 (65 pages).

* cited by examiner

TRIANGULAR FOOD PRODUCT FOLDING APPARATUS

CROSS-REFERENCE TO RELATED APPLICATION

The present application claims the benefit of priority to U.S. Provisional Patent Application No. 62/346,661, filed Jun. 7, 2016, which is hereby incorporated by reference in its entirety for all purposes.

TECHNICAL FIELD

The present disclosure relates to a food product folding apparatus and, in particular, to a food product folding apparatus including multiple folding platforms that are actuated to fold a food product.

BACKGROUND

A variety of methods of folding food products are known in the industry. For example, manual folding operations can be used. Manual folding operations can be labor intensive and involve a high degree of dexterity. The time undertaken by an operator to fill and fold a piece of dough to produce a folded food product also limits the production rate where the folding operations are carried out by hand.

High speed food product folding machines are also known in the industry, such as those of U.S. Pat. Nos. 5,912,035, 7,487,718, U.S. Patent Publication No. 2015/0128817, and U.S. Patent Publication No. 2015/0075390, and all four (4) of the foregoing patents and publications are incorporated herein by reference. However, food products having different configurations, such as the triangular shape of samosas or similar food products, require different folding techniques.

A need remains for an effective food product folding apparatus that folds dough to produce a substantially triangular food product. These and other considerations are addressed by embodiments of the food product folding apparatus of the present disclosure.

SUMMARY

In accordance with embodiments of the present disclosure, an exemplary food product folding apparatus for forming a triangular food product is provided that generally includes a folding section, a first actuator mechanism, a second actuator mechanism, and a third actuator mechanism. The folding section includes a first folding platform, a second folding platform, and a third folding platform configured to be actuated individually and sequentially to fold the food product into the triangular food product. The first actuator mechanism can be configured to actuate rotation of the first folding platform into a first fold position to create a first fold in the food product. The second actuator mechanism can be configured to actuate rotation of the second folding platform into a second fold position to create a second fold in the folded food product. The third actuator mechanism can be configured to actuate rotation of the third folding platform into a third fold position to create a third fold in the folded food product and form the triangular food product.

In some embodiments, the triangular food product can be formed by creating three folds in the food product. For example, a filling deposited on the food product prior to folding can be completely encased within the folded food product after three folds have been made in the sheet of dough. Thus, although discussed herein with five folding platforms, it should be understood that the triangular food product can be formed with an apparatus including only three folding platforms. In some embodiments, the triangular food product can be formed by creating four or more folds in the food product. In some embodiments, the folding section can include a fourth folding platform and the apparatus can include a fourth actuator mechanism configured to actuate rotation of the fourth folding platform into a fourth fold position to create a fourth fold in the folded food product. Substantially similar folding platforms and actuator mechanisms can be used for an apparatus configured to create four or more folds in the food product.

The first actuator mechanism and the third actuator mechanism can be disposed on one side of the folding section, while the second actuator mechanism and the fourth actuator mechanism can be disposed on an opposing side of the folding section. The first, second, third and fourth actuator mechanisms can be configured to actuate sequentially to sequentially create the first, second, third and fourth folds. The first, second, third and fourth folding platforms can be staggered in elevation relative to each other to form a vertical space between each of the respective first, second, third and fourth folding platforms.

Each of the first, second, third and fourth folding platforms include a planar portion and a raised edge. The planar portion can define an equilateral triangle. The folding section can include a top loading platform disposed adjacent to the first folding platform. The folding section can include a bottom unloading platform disposed on an end of the folding section opposite from the top loading platform (e.g., adjacent to the fourth folding platform). The folding section can include a fifth folding platform disposed adjacent to the fourth folding platform. The apparatus can include a fifth actuation mechanism configured to actuate rotation of the fifth folding platform into a fifth fold position in cooperation with the fourth folding platform to crate the fourth fold.

Each of the first, second, third and fourth actuator mechanisms can include a gear wheel, an actuator gear in mechanical cooperation with the gear wheel, a flange secured to the actuator gear, and a roller rotatably mounted to a proximal end of the flange. The flange can be biased by a spring in a direction away from its respective one of the first, second, third and fourth fold positions of the first, second, third and fourth folding platforms. In some embodiments, the first, second, third and fourth actuator mechanisms can be in the form of rack and pinion mechanisms.

The folding section can be mounted to a structural block disposed below the folding section. The structural block can be secured to a support surface, such as a conveyor system (e.g., as disclosed in U.S. Pat. No. 5,912,035) via a support rod. In some embodiments, the folding section can be tilted relative to the support surface (and/or the conveyor of U.S. Pat. No. 5,912,035) by an angle between approximately ten degrees and forty degrees with respect to a horizontal.

In accordance with embodiments of the present disclosure, an exemplary food product folding system for forming a triangular food product is provided that generally includes a food product folding apparatus as described herein, a first curved track and a second curved track. The first curved track can be disposed on one side of the food product folding apparatus. The second curved track can be disposed on an opposing side of the food product folding apparatus. The first and second curved tracks can sequentially actuate at least one of the first, second, and third actuator mechanisms (and optionally the fourth actuator mechanism) as the food product folding apparatus moves along the first and second curved tracks.

Each of the first and second curved tracks can include peaks and valleys. The peaks for the first and second curved tracks actuate the respective first, second, third and fourth folding platforms into the first, second, third and fourth fold positions.

In accordance with embodiments of the present disclosure, an exemplary method of forming a triangular food product is provided. The method includes positioning a food product (e.g., a sheet of dough) on a folding section of a food product folding apparatus described herein. The method includes depositing a filling on a portion of the food product, the filling being deposited such that the folded food product completely seals the filling within the food product. The method includes actuating the first actuator mechanism to actuate rotation of the first folding platform into a first fold position to create a first fold in the food product. The method includes actuating the second actuator mechanism to actuate rotation of the second folding platform into a second fold position to create a second fold in the folded food product. The method includes actuating the third actuator mechanism to actuate rotation of the third folding platform into a third fold position to create a third fold in the folded food product to form the triangular food product. In some embodiments, the method includes actuating the fourth actuator mechanism to actuate rotation of the fourth folding platform in to a fourth fold position to create a fourth fold in the folded food product.

In some embodiments, the method can include actuating the fifth actuator mechanism to actuate rotation of a fifth folding platform into a fifth fold position in cooperation with the fourth folding platform to create the fourth fold in the folded food product. In some embodiments, the food product can be a sheet of dough configured to be folded into the triangular food product.

In accordance with embodiments of the present disclosure, an exemplary food product folding apparatus for forming a triangular food product is provided. The food product folding apparatus includes a folding section including a first folding platform, a second folding platform, a third folding platform, and a fourth folding platform. The food product folding apparatus includes a first actuator mechanism configured to actuate rotation of the first folding platform into a first fold position to create a first fold in a food product. The food product folding apparatus includes a second actuator mechanism configured to actuate rotation of the second folding platform into a second fold position to create a second fold in the folded food product. The food product folding apparatus includes a third actuator mechanism configured to actuate rotation of the third folding platform into a third fold position to create a third fold in the folded food product. The food product folding apparatus includes a fourth actuator mechanism configured to actuate rotation of the fourth folding platform into a fourth fold position and form the triangular food product.

The first actuator mechanism, the third actuator mechanism and the fourth actuator mechanism can be disposed on one side of the folding section, and the second actuator mechanism can be disposed on an opposing side of the folding section. The first, second, third and fourth actuator mechanisms are configured to actuate sequentially to sequentially create the first, second, third and fourth folds of the folded food product. In some embodiments, the first, second, third and fourth folding platforms can be staggered in elevation relative to each other to form a vertical space between each of the respective first, second, third and fourth folding platforms.

Each of the first, second, third and fourth folding platforms can include a planar portion and one or more raised edges. In some embodiments, the planar portion of the first folding platform can define a scalene triangle. In some embodiments, the planar portion of the second, third and fourth folding platform can define an equilateral triangle.

The folding section includes a discharge platform and a fifth actuator mechanism configured to actuate rotation of the discharge platform between a dough receiving position and a discharge position. The discharge platform can include a planar portion and one or more raised sections at corners of the planar portion. In some embodiments, the planar portion and the raised sections of the discharge platform can define equilateral triangles.

In some embodiments, each of the first, second, third and fourth actuator mechanisms includes a gear, a geared track engaged with the gear, an actuator bar coupled to the geared track, and a roller rotatably mounted to the actuator bar. Each of the first, second, third and fourth actuator mechanisms can include a spring assembly biasing the respective first, second, third and fourth folding platforms away from the first, second, third and fourth folding positions. The folding section can be mounted to a structural block disposed below the folding section. The structural block can be secured to a support surface via a support rod. The folding section can tilted relative to the support surface by an angle between approximately ten degrees and approximately forty degrees with respect to horizontal.

In accordance with embodiments of the present disclosure, an exemplary food product folding system for forming a triangular food product is provided. The food product folding system includes a food product folding apparatus. The food product folding apparatus includes a folding section including a first folding platform, a second folding platform, a third folding platform and a fourth folding platform. The food product folding apparatus includes a first actuator mechanism configured to actuate rotation of the first folding platform into a first fold position to create a first fold of in a food product. The food product folding apparatus includes a second actuator mechanism configured to actuate rotation of the second folding platform into a second fold position to create a second fold in the folded food product. The food product folding apparatus includes a third actuator mechanism configured to actuate rotation of the third folding platform into a third fold position to create a third fold in the folded food product. The food product folding apparatus includes a fourth actuator mechanism configured to actuate rotation of the fourth folding platform into a fourth fold position to create a fourth fold in the folded food product and form the triangular food product.

The food product folding system includes a first actuation track disposed on one side of the food product folding apparatus. The food product folding system includes a second actuation track disposed on an opposing side of the food product folding apparatus. The first and second actuation tracks sequentially actuate at least one of the first, second, third and fourth actuator mechanisms as the food product folding apparatus moves along the first and second curved tracks. Each of the first and second actuation tracks includes peaks and valleys. The peaks for the first and second actuation tracks actuate the respective first, second, third and fourth folding platforms into the first, second, third and fourth fold positions.

In accordance with embodiments of the present disclosure, an exemplary method of forming a triangular food product is provided. The method includes positioning a food product on a folding section of a food product folding apparatus, the food product folding apparatus including a first folding platform, a second folding platform, a third folding platform and a fourth folding platform. The method includes actuating a first actuator mechanism to actuate rotation of the first folding platform into a first fold position to create a first fold in the food product. The method includes actuating a second actuator mechanism to actuate rotation of the second folding platform into a second fold position to create a second fold in the folded food product.

The method includes actuating a third actuator mechanism to actuate rotation of the third folding platform into a third fold position to create a third fold in the folded food product. The method includes actuating a fourth actuator mechanism to actuate rotation of the fourth folding platform into a fourth fold position to create a fourth fold in the folded food product to form the triangular food product. The method includes actuating a fifth actuator mechanism to actuate rotation of a discharge platform into a discharge position to discharge the triangular food product from the folding section of the food product folding apparatus. The food product can be a sheet of dough configured to be folded into the triangular food product.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed exemplary embodiment of a food product folding apparatus, reference is made to the accompanying figures, wherein.

DESCRIPTION OF EXEMPLARY EMBODIMENTS

Figure 1:
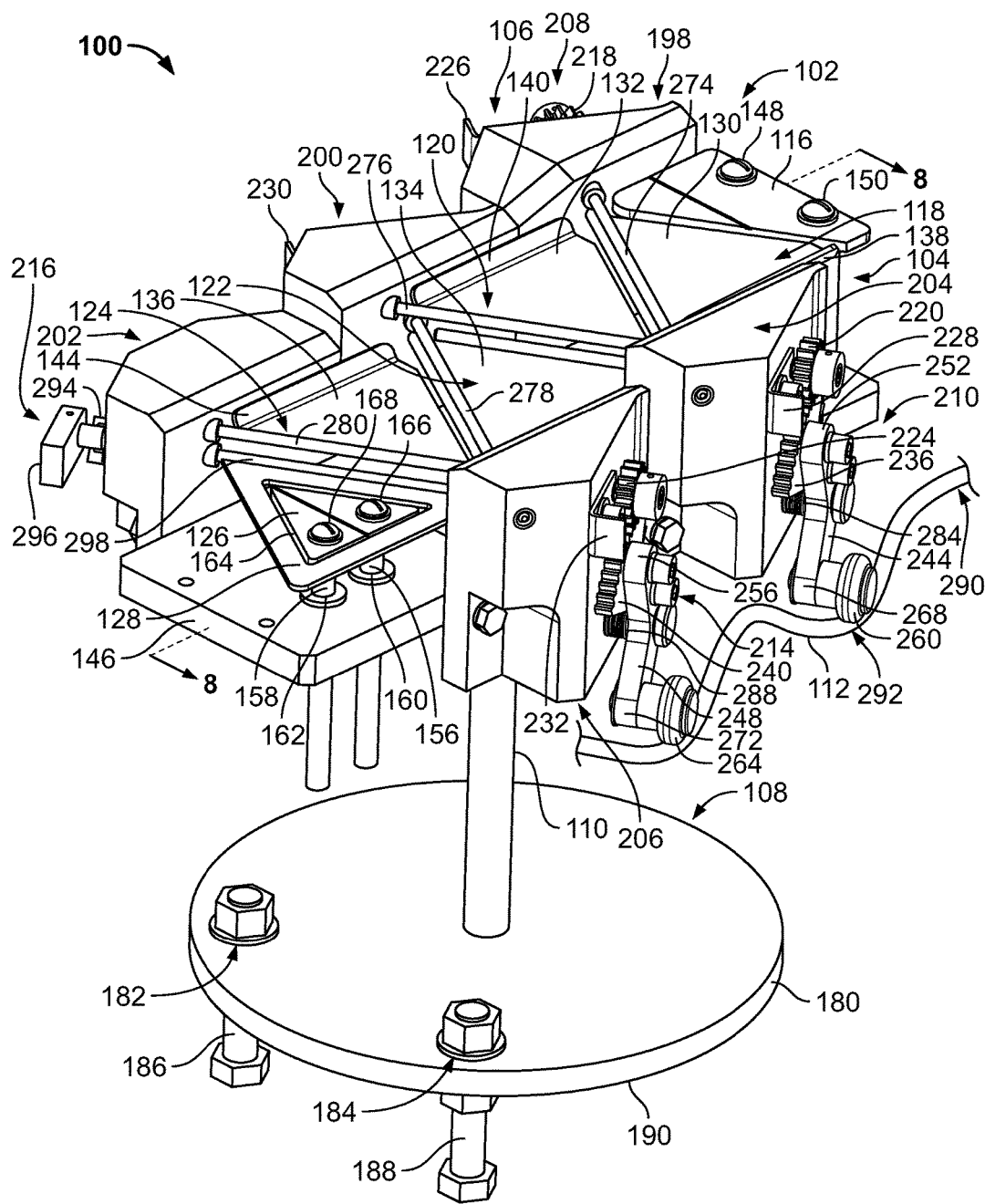
FIG. 1 is a right, front perspective view of a first example embodiment of a food product folding apparatus according to the present disclosure.
Figure 2:
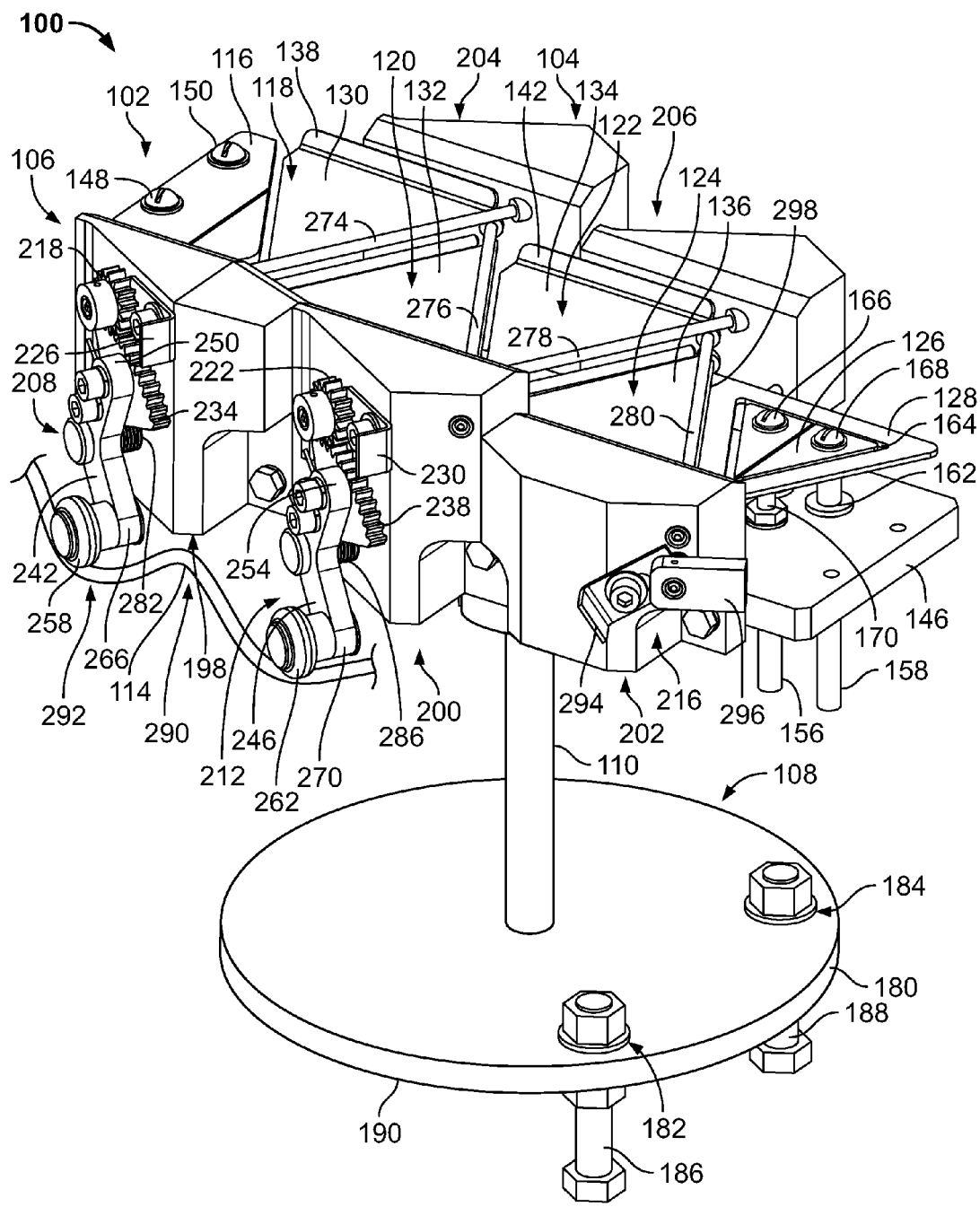
FIG. 2 is a left, front perspective view of the first example embodiment of FIG. 1.
Figure 3:
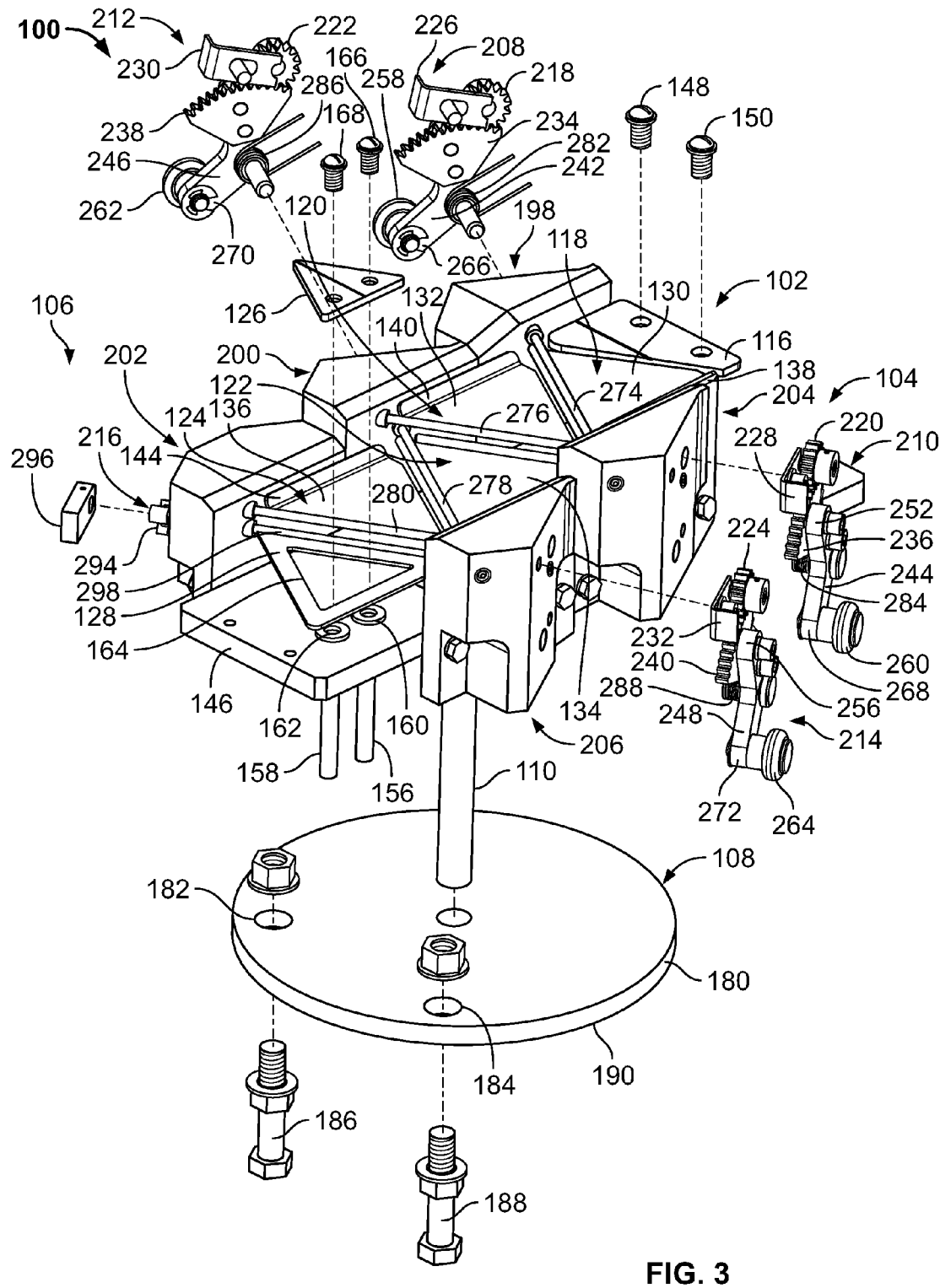
FIG. 3 is a partially exploded perspective view of the first example embodiment of FIG. 1.
Figure 4:
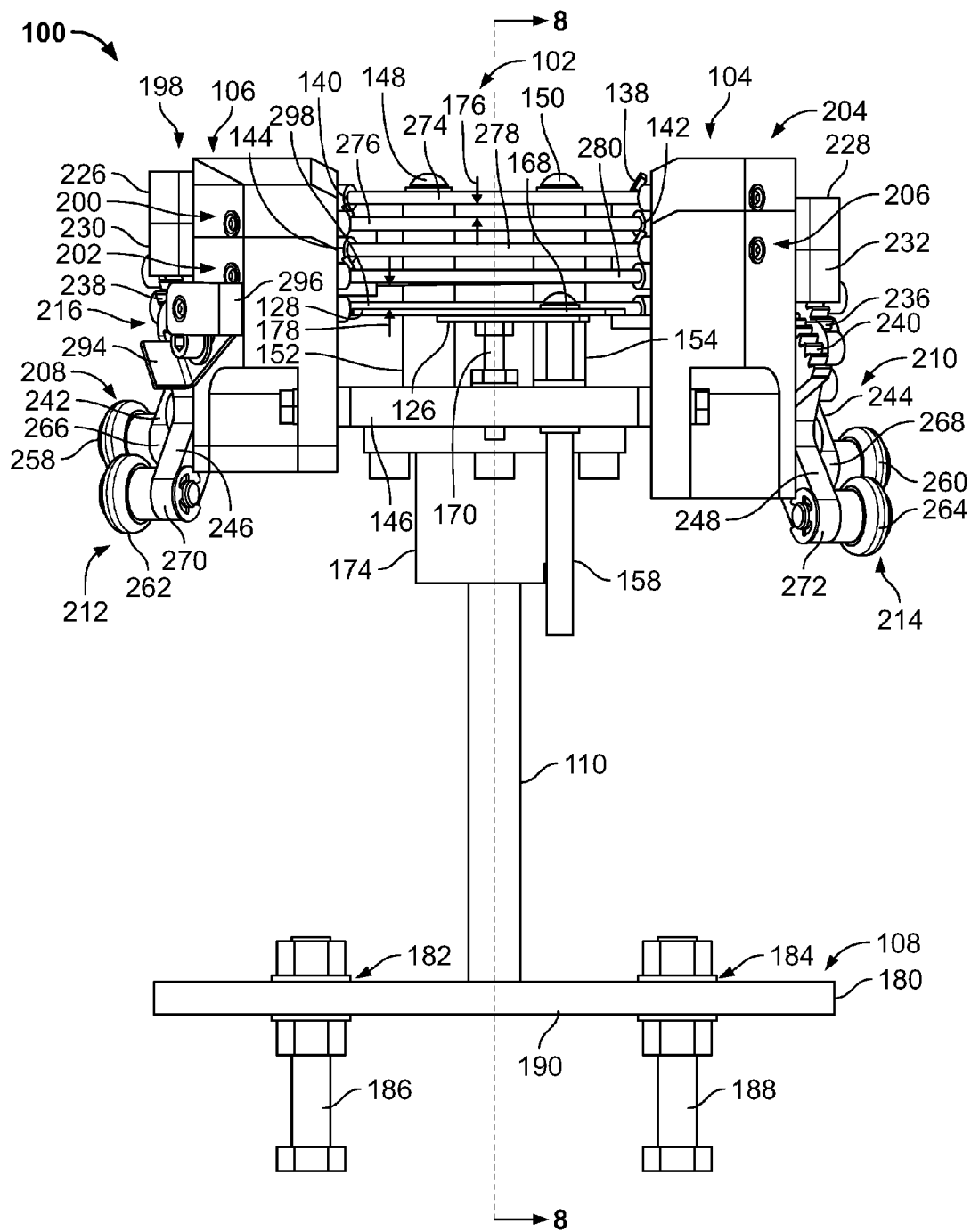
FIG. 4 is a front view of the first example embodiment of FIG. 1.
Figure 5:
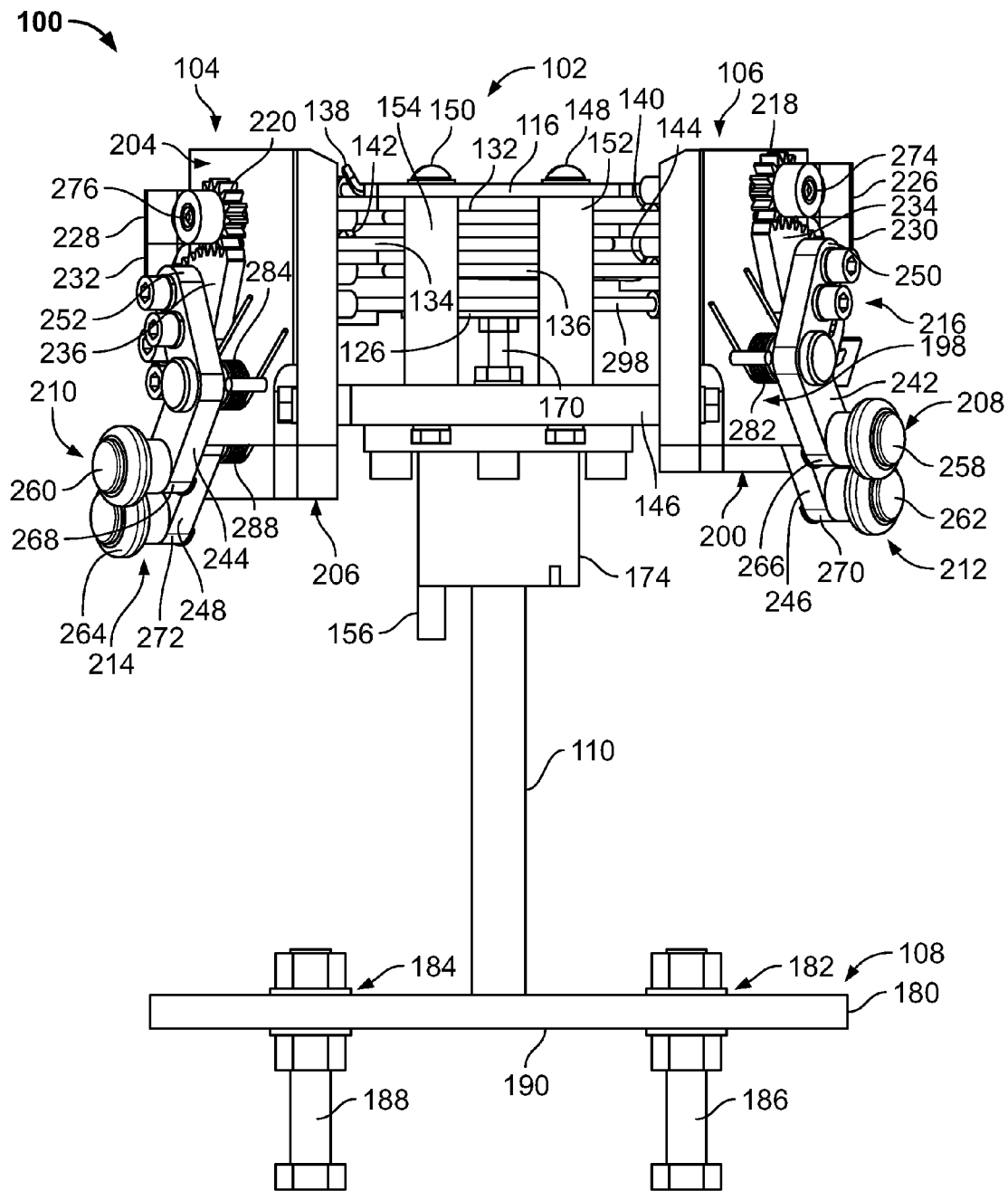
FIG. 5 is a rear view of the first example embodiment of FIG. 1.
Figure 6:
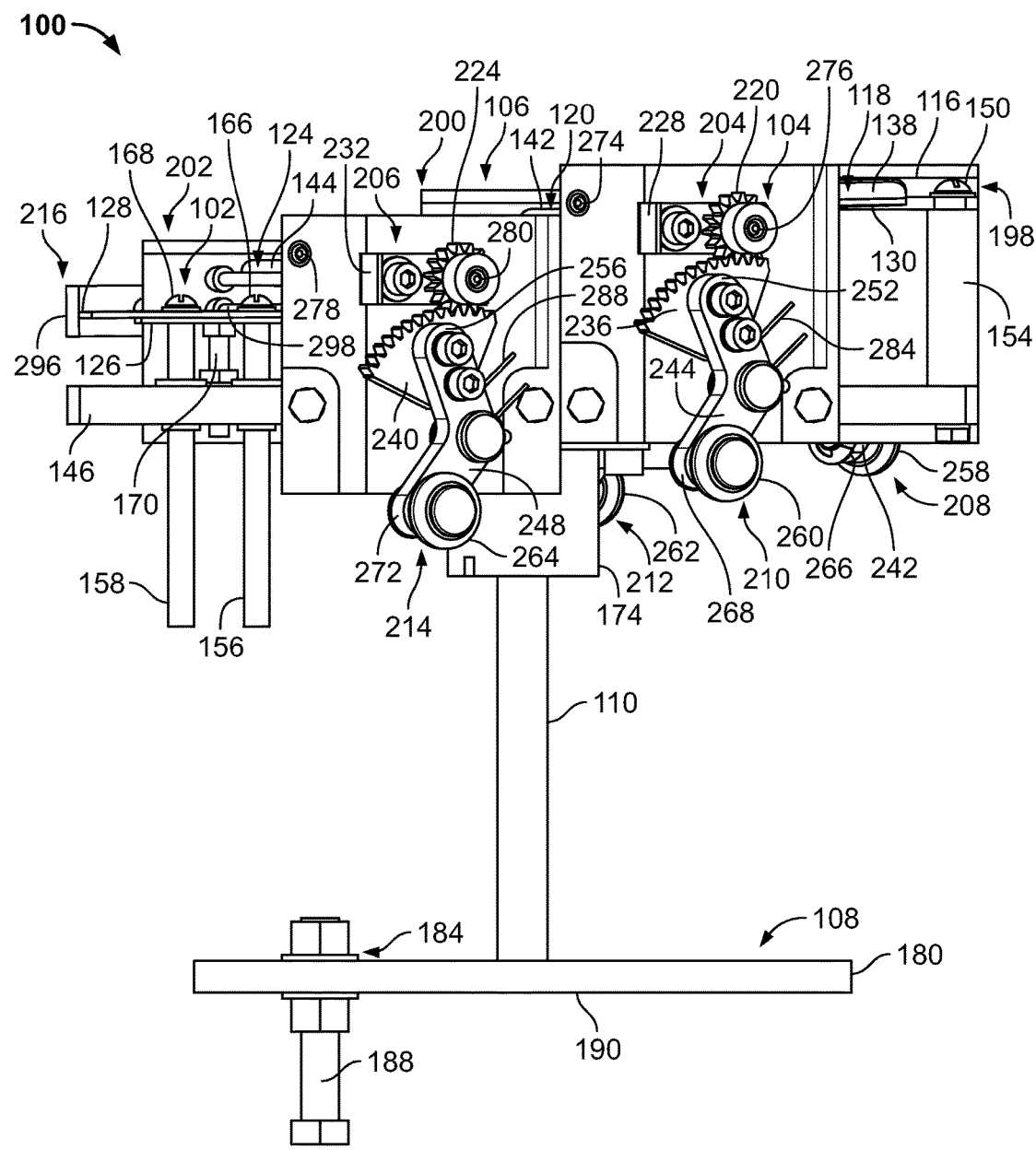
FIG. 6 is a right side view of the first example embodiment of FIG. 1.
Figure 7:
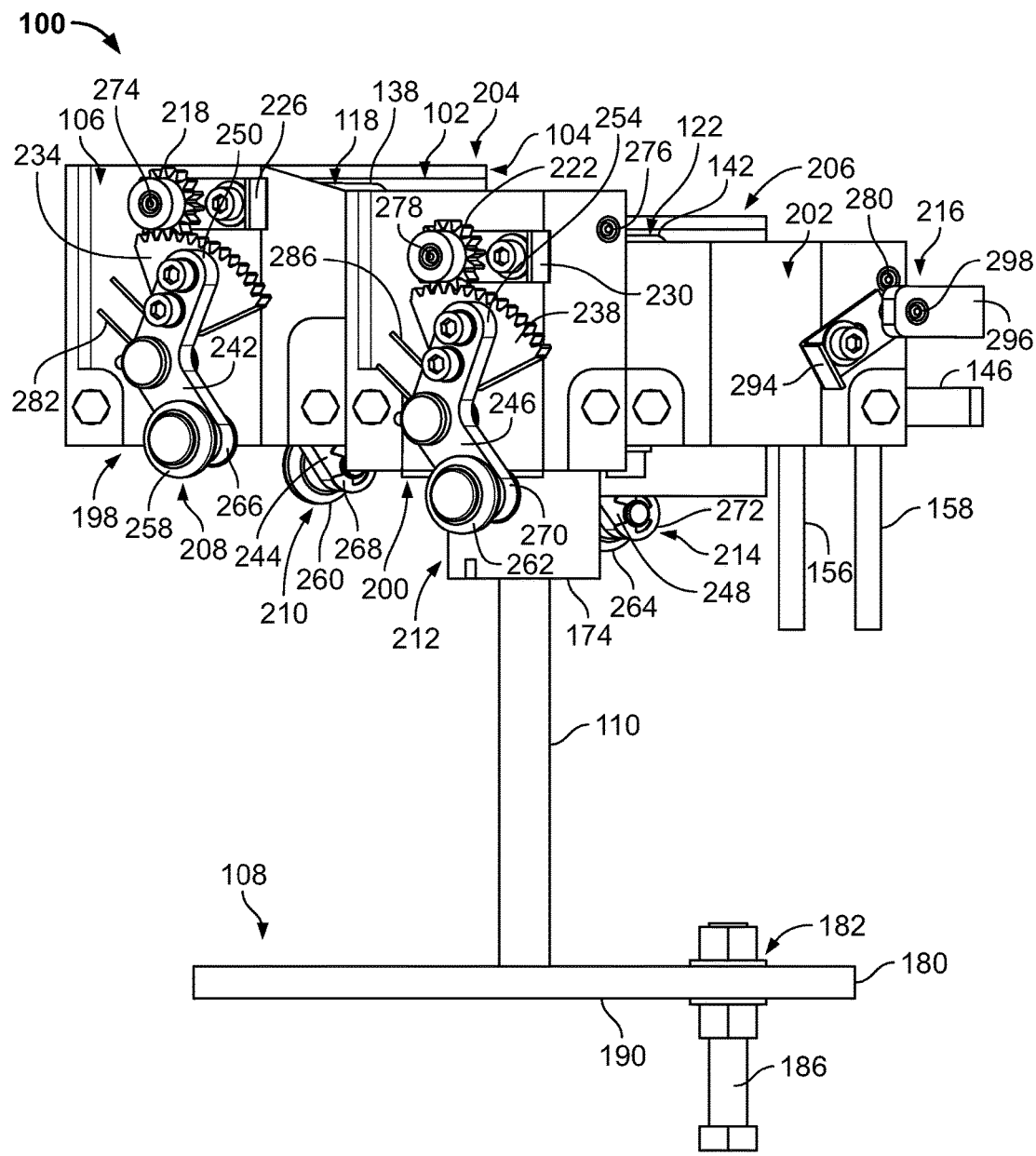
FIG. 7 is a left side view of the first example embodiment of FIG. 1.

It should be understood that the relative terminology used herein, such as "front", "rear", "left", "top", "bottom", "vertical", and "horizontal" is solely for the purposes of clarity and designation and is not intended to limit the invention to embodiments having a particular position and/or orientation. Accordingly, such relative terminology should not be construed to limit the scope of the present invention. In addition, it should be understood that the invention is not limited to embodiments having specific dimensions. Thus, any dimensions provided herein are merely for an exemplary purpose and are not intended to limit the invention to embodiments having particular dimensions.

With reference to FIGS. 1-8, perspective, exploded, front, rear, right, left and cross-sectional views of a first embodiment of a food product folding apparatus 100 (hereinafter "apparatus 100"), e.g., a triangular food product folding apparatus, are provided. The apparatus 100 generally includes a folding section 102, a right side actuation section 104 (e.g., a first actuation section) disposed on the right side of the folding section 102, and a left side actuation 106 (e.g., a second actuation section) disposed on the left side of the folding section 102 (e.g., opposite from the right side actuation section 104). The apparatus 100 includes a base 108 and a support rod 110 structurally connecting the folding section 102 with the base 108. It is noted that the base 108 provides only a schematic representation of connection of the apparatus 100 to a conveyor system. In some embodiments, the apparatus 100 can be connected directly to the conveyor system (e.g., the conveyor of U.S. Pat. No. 5,912,035) via the support rod 110 (or a similar structure). In some embodiments, the apparatus 100 can be connected to a rotary actuation system including cams, such as the rotary actuation system disclosed in U.S. Patent Publication No. 2015/0075390. The right and left side actuation sections 104, 106 can be actuated by respective actuation or drive systems in the form of first and second curved tracks 112, 114 disposed on opposite sides of the apparatus 100 (such as the rod-like cams 60 of U.S. Pat. No. 5,912,035). Each of the above components will be discussed in greater detail below.

The folding section 102 includes a top loading platform 116, a first folding platform 118, a second folding platform 120, a third folding platform 122, a fourth folding platform 124, and a bottom unloading platform 126 including a fifth folding platform 128. Although illustrated with first, second, third, fourth and fifth folding platforms 118-124, 128, in some embodiments, only three folding platforms can be used to create a triangular food product. In particular, a filling deposited on the food product can be completely sealed within the folded food product by creating only three folds. In some embodiments, the folding section 102 can include more than five folding platforms to create six or more folds in the food product.

Each of the folding platforms 118-124 includes a respective planar portion 130-136 that defines a planar plate having a triangular configuration. In some embodiments, the planar portions 130-136 define an equilateral triangle configuration. Each of the folding platforms 118-124 further includes a respective raised edge 138-144 extending from a respective one of the triangular planar portions 130-136. In particular, the raised edges 138-144 extend the length of one of the edges of the triangular planar portions 130-136. In some embodiments, the raised edges 138-144 can be angled relative to the planar portions 130-136 by, e.g., between 30-90 degrees, 45-85 degrees, 65-80 degrees, or the like.

The top loading platform 116 defines a planar plate secured to a structural block 146 extending below the folding section 102 for support. In some embodiments, the structural block 146 can define a substantially rectangular configuration and can extend beyond the front and rear sides of the folding section 102. The support rod 110 can be received within an opening 172 of an adapter 174 mounted to the bottom surface of the structural block 146, thereby connecting the folding section 102 and the structural block 146 to the base 108. In some embodiments, rather than including the base 108, the support rod 110 can connect the apparatus directly to a conveyor system or a rotary system (such as those systems disclosed in U.S. Pat. No. 5,912,035 and/or and U.S. Patent Publication No. 2015/0075390, for example). The top loading platform 116 can be secured to the structural block 146 with two fasteners 148, 150 (e.g., bolts, screws, or the like). In some embodiments, separator washers 152, 154 can be disposed between the bottom surface of the top loading platform 116 and the top surface of the structural block 146 to provide structural support to the apparatus 100.

The bottom unloading platform 126 can be in the form of a planar plate defining an equilateral triangle secured to two actuation rods 156, 158 with fasteners 166, 168 (e.g., screws, bolts, or the like). In some embodiments, the bottom unloading platform 126 can be in the form of two right triangles positioned adjacent to each other to form an equilateral triangle, with each of the right triangles being secured to the respective actuation rod 156, 158. In some embodiments, the actuation rods 156, 158 can be movably disposed relative to the structural block 146 such that actuation of the actuation rods 156, 158 allows the actuation rods 156, 158 to individually translate through openings 160, 162 in the structural block 146. Translation of the actuation rods 156, 158 through the openings 160, 162 adjusts the position of the bottom unloading platform 126 relative to the structural block 146.

The actuation rods 156, 158 can be coupled to any type of actuation device, e.g., a flange and roller combination similar to flange 248 and roller 264, such that the actuation device is in contact with the tracks 112, 114. Peaks 290 in the tracks 112, 114 can therefore translate the actuation rods 156, 158 upwards to discharge the folded food product, while the valleys 292 in the tracks 112, 114 lower the actuation rods 156, 158 in preparation for the next folded food product. In some embodiments, the bottom unloading platform 126 can include a limiter rod 170 extending from the structural block 146 below the bottom unloading platform 126. The limiter rod 170 can limit the minimum translation distance of the bottom unloading platform 126 relative to the top surface of the structural block 146.

The fifth folding platform 128 can be in the form of a planar equilateral triangle including an inner cutout 164 in the form of an equilateral triangle. In particular, the inner cutout 164 can be configured and dimensioned to be slightly greater than the configuration and dimension of the bottom unloading platform 126 such that the bottom unloading platform 126 can be disposed within the inner cutout 164 and can translate relative to the structural block 146 without interfering with the fifth folding platform 128. Similarly, as will be discussed below, the fifth folding platform 128 can be actuated to rotate without interfering with the bottom unloading platform 126.

The planar portion 130 of the first folding platform 118 can be substantially aligned with the top surface of the top loading platform 116. However, the planar portions 130-136 can be staggered in height relative to each other from the top loading platform 116 to the bottom unloading platform 126. In particular, the planar portions 130-136 can be separated by a staggered vertical space or height 176 (see, e.g., FIG. 4). The planar portion 136 of the fourth folding platform 124 can be staggered relative to the fifth folding platform 128 by a height 178 (see, e.g., FIG. 4). The staggered elevation between the folding platforms 118-124, 128 allows for the sequential folding of the food product to produce a food product having a thickness with rounded edges (i.e., rather than a flat folded food product). In addition, the staggered elevation between the folding platforms 118-124, 128, coupled with the angling of the base 108 relative to a horizontal (discussed below), allows for sequential folding of the food product without undesired shifting of the food product on the folding section 102.

Figure 8:
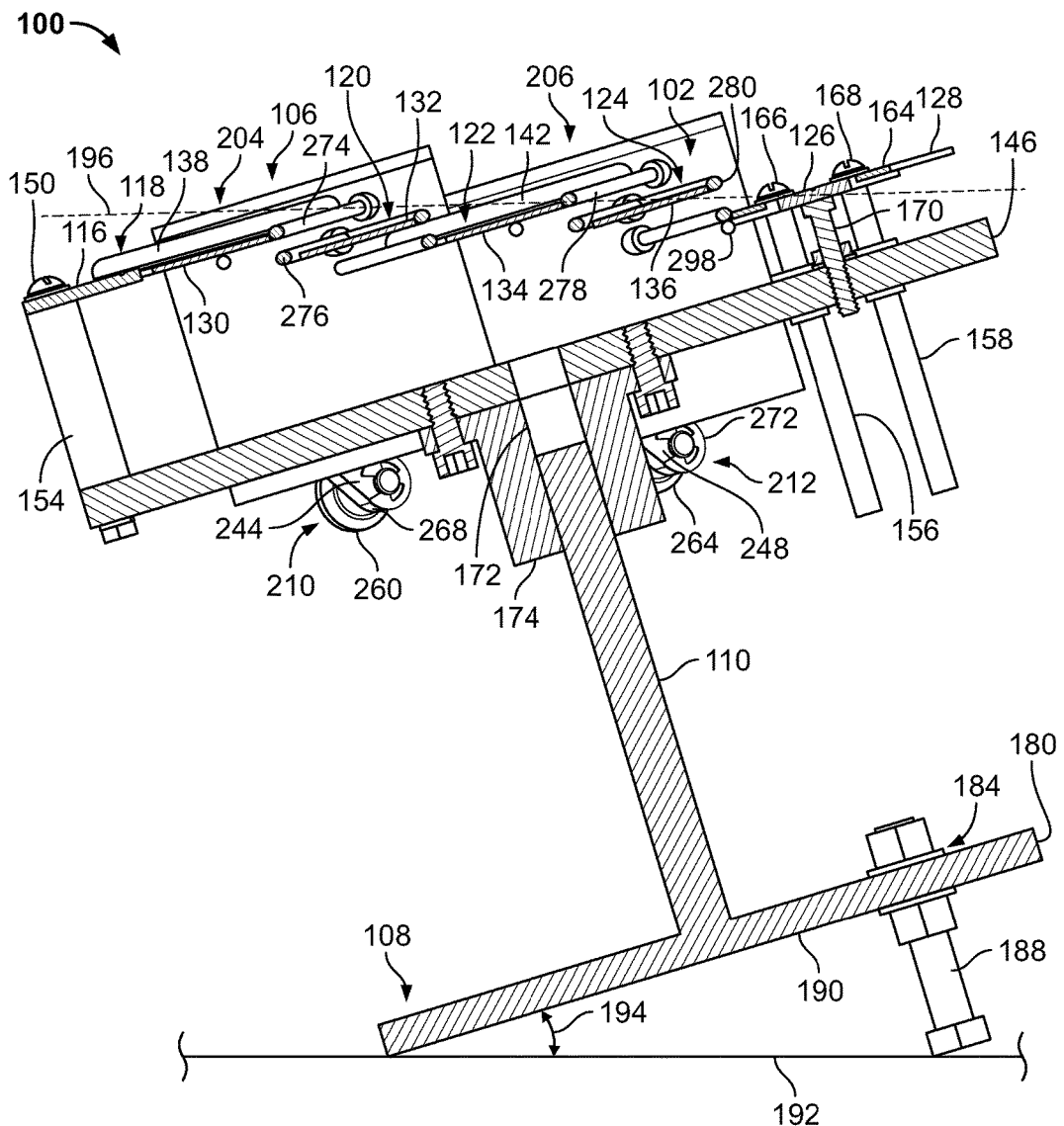
FIG. 8 is a cross-sectional, left side view of the first example embodiment of FIG. 1 taken along section line 8-8.

The base 108 can define a round perimeter 180 with two openings 182, 184 formed on a side corresponding to the front of the structural block 146. Respective elevation rods 186, 188 can be mounted within the openings 182, 184 such that the majority of the elevation rods 186, 188 extend from a bottom surface 190 of the base 108. During use, as shown in FIG. 8, the base 108 can be positioned on a substantially flat supporting surface 192. The elevation rods 186, 188 disposed on one side of the base 108 elevate the front end of the apparatus 100 relative to the supporting surface 192 by an angle 194 (e.g., between approximately 10-40 degrees, between approximately 20-30 degrees, approximately 25 degrees, or the like), thereby tilting the folding section 102. The tilted folding section 102 minimizes the product-shifting effect of gravity on the staggered elevation between the folding platforms 118-124, 128, while maintaining the food product substantially parallel to the supporting surface 192 (as shown by the axis 196 representing the position of the food product on the folding section 102). In some embodiments, the elevation rods 186, 188 can be screws or bolts mounted to the base 108, and the extension of the elevation rods 186, 188 from the bottom surface 190 can be adjusted to vary the angle 194. The base 108 is illustrated herein as a schematic representation of a connection of the apparatus 100 to a conveyor or rotary system. In some embodiments, rather than including a base 108, the apparatus 100 can be secured directly to a supporting surface 192 of a conveyor or rotary system via the support rod 110, and the connection between the support rod 110 and the structural block 146 can be tilted by the angle 194 such that the apparatus 100 is angled relative to the conveyor or rotary system.

The left side actuation section 106 includes a first actuator block 198, a third actuator block 200 and a fifth actuator block 202. The right side actuation section 104 includes a second actuator block 204 and a fourth actuator block 206. The first actuator block 198, second actuator block 204, third actuator block 200 and fourth actuator block 206 each include respective actuator mechanisms 208-214 rotatably mounted thereon. In some embodiments, the fifth actuator block 202 includes an actuator mechanism 216 that differs from the actuator mechanisms 208-214. The actuator mechanism 208 can be configured to actuate rotation of the first folding platform 118. The actuator mechanism 210 can be configured to actuate rotation of the second folding platform 120. The actuator mechanism 212 can be configured to actuate rotation of the third folding platform 122. The actuator mechanism 214 can be configured to actuate rotation of the fourth folding platform 124. Substantially simultaneously to actuation of the actuator mechanism 214, the actuator mechanism 216 can be configured to actuate rotation of the fifth folding platform 128.

Each of the actuator mechanisms 208-214 includes a top gear wheel 218-224 rotatably mounted to the respective actuator block 198, 204, 200, 206 with an L-shaped bracket 226-232. Each of the actuator mechanism 208-214 further includes an actuator gear 234-240 secured to a substantially L-shaped flange 242-248, the flange 242-248 being rotatably mounted to the respective actuator block 198, 204, 200, 206. The actuator gear 234-240 can be secured to a distal end 250-256 of the flange 242-248, and a roller 258-264 can be rotatably mounted to a proximal end 266-272 of the flange 242-248. The flange 242-248 can be rotatably mounted to the respective actuator block 198, 204, 200, 206 at a midpoint between the distal end 250-256 and the proximal end 266-272.

The flange 242-248 can pivot at the mounted midpoint to partially rotate the actuator gears 234-240 from the unfolded position shown in FIGS. 1-8 at one end of the actuator gears 234-240 to a fold position at the opposite end of the actuator gears 234-240. Although illustrated as rotating gear/flange actuator mechanisms, it should be understood that the apparatus 100 can include rack and pinion actuator mechanisms (e.g., similar to the actuator mechanisms of the apparatus 400). The flanges 242-248 can be biased into the unfolded position shown in FIGS. 1-8 by springs 282-288 such that after actuation of the actuator gears 234-240 into the fold position, the springs 282-288 automatically bias the actuator gears 234-240 into the unfolded position. The teeth of the respective top gear wheels 218-224 and actuator gears 234-240 can be configured to mesh such that rotation of the actuator gears 234-240 actuates rotation of the top gear wheels 218-224. Each of the actuator mechanisms 208-214 includes a shaft 274-280 secured to the respective top gear wheels 218-224 at one end and secured to the respective folding platforms 118-124. Rotation of the top gear wheels 218-224 simultaneously rotates the shafts 274-280 which, in turn, rotate the respective folding platforms 118-124 from the unfolded position (e.g., a substantially flat and parallel position) to a folding position (e.g., folded over onto the next adjacent folding platform 118-124) to fold the food product. As noted above, the apparatus 100 can include only three folding platforms 118-122 to form the triangular food product, and therefore can include only three actuation mechanisms 208-212. In some embodiments, the apparatus 100 can include six or more folding platforms with respective actuator mechanisms. In some embodiments, the actuator mechanisms can be in the form of rack and pinion mechanisms.

The central axes of the shafts 274-280 can extend in parallel planes. The central axes of the shafts 274, 278 can be substantially parallel to each other. Similarly, the central axes of the shafts 276, 280 can be substantially parallel to each other. However, the central axes of the shafts 274, 278 can extend in intersection directions relative to the central axes of the shafts 276, 280. Therefore, the folding platforms 118, 122 rotate in one direction, while the folding platforms 120, 124 rotate in another direction. In some embodiment, the directions of folding of the folding platforms 118, 122 and the folding platforms 120, 124 can differ by, e.g., between approximately 45-85 degrees, between approximately 55-75 degrees, approximately 60 degrees.

The rollers 258-264 can be configured to be in contact with and ride along the curved tracks 112, 114 disposed on either side of the apparatus 100. Each of the curved tracks 112, 114 includes peaks 290 and valleys 292. The apparatus 100 can travel along a conveyor belt (not shown) such that the base 108 is screwed to the belt, and each of the rollers 258-264 (as cams) sequentially enters a peak 290 of the respective track 112, 114. As an example, actuation of roller 258 with the track 114 will be discussed. However, it should be understood that the rollers 26-264 can be similarly actuated by the respective track 112, 114. As the roller 258 enters a peak 290 of the track 114, the raised track 114 imparts a force on the roller 258 that overcomes the biasing force of the spring 282, thereby pivoting the flange 242. Pivoting the flange 242 simultaneously rotates the actuator gear 234 which, in turn, rotates the gear wheel 218. Rotation of the gear wheel 218 simultaneously rotates the shaft 274 which, in turn, rotates the first folding platform 118 into a fold position over the second folding platform 120. The fold position of the first folding platform 118 can correspond to the highest point of the peak 290 of the track 114. As the apparatus 100 continues to travel along the conveyor belt and the roller 258 moves from the peak 290 into the valley 292, the biasing force of the spring 282 gradually returns the flange 242 and, thereby the first folding platform 118, into the unfolded position.

The actuator mechanism 216 includes an L-shaped bracket 294 mounted to the actuator block 202, and an actuator bar 296 rotatably mounted to the actuator block 202. In some embodiments, the actuator mechanism 216 can be substantially similar in structure and function to the actuator mechanisms 208-214. In some embodiments, the actuator mechanism 216 can be in the form of a rack and pinion mechanism. A shaft 298 can be secured to the actuator bar 296 such that rotation of the actuator bar 296 simultaneously rotates the shaft 298. The shaft 298 can further be secured to the fifth folding platform 128 such that rotation of the shaft 298 simultaneously rotates the fifth folding platform 128 into a fold position. In particular, the actuator bar 296 can be actuated substantially simultaneously to actuation of the actuator mechanism 212 such that the fourth folding platform 124 and the fifth folding platform 128 simultaneously rotate towards each other in clamshell fashion to sandwich the food product between the fourth and fifth folding platforms 124, 128. It is noted that the staggered elevation of the folding platforms 118-124, 128 and, thereby the staggered elevation of the shafts 274-280, 298, allows for the endpoints of the shafts 274-280, 298 to be disposed over each other (or substantially over each other) during entry into the respective actuator blocks 198-206 and intersect without interfering with rotation of the shafts 274-280, 298.

Figure 9:
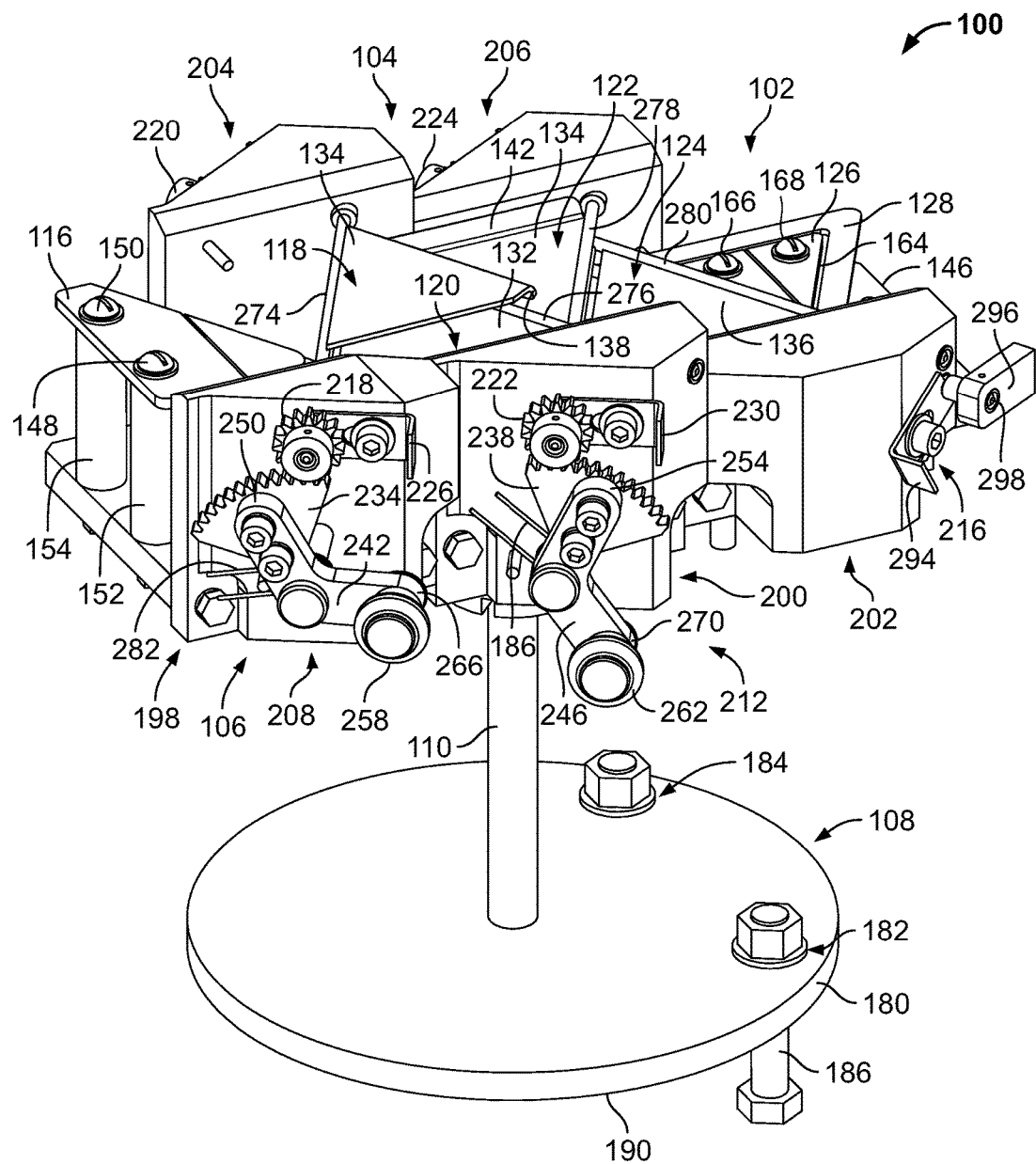
FIG. 9 is a perspective view of the first example embodiment of FIG. 1 including a first folding platform actuated into a first fold position.

FIG. 9 is a perspective view of the apparatus 100 with the first folding platform 118 actuated into a fold position (e.g., a first fold position). In particular, while the first folding platform 118 is in the fold position, the remaining folding platforms 120-124, 128 are in the unfolded position. As shown in FIG. 9, the actuator mechanism 208 has been actuated to rotate the actuator gear 234 from one end representing the unfolded position to the opposing end representing the fold position. In the first fold position, the first folding platform 118 can rotate to be disposed above the second folding platform 120 in a substantially parallel and spaced manner.

Figure 10:
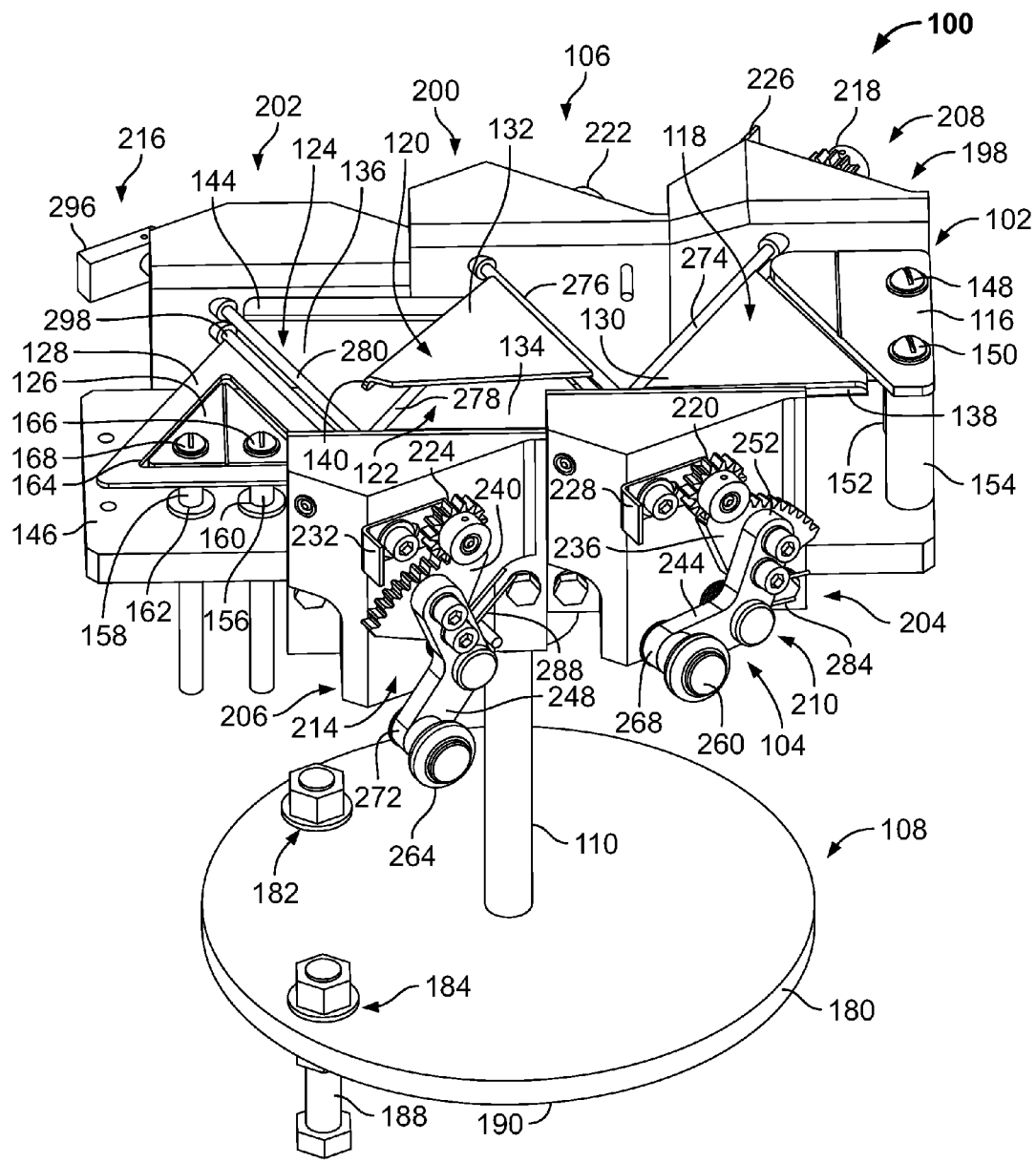
FIG. 10 is a perspective view of the first example embodiment of FIG. 1 including a second folding platform actuated into a second fold position.

FIG. 10 is a perspective view of the apparatus 100 with the second folding platform 120 actuated into a fold position (e.g., a second fold position). While the second folding platform 120 is in the fold position, the remaining folding platforms 118, 122, 124, 128 are in the unfolded position. As shown in FIG. 10, the actuator mechanism 210 has been actuated to rotate the actuator gear 236 from one end representing the unfolded position to the opposing end representing the fold position. In the second fold position, the second folding platform 120 can rotate to be disposed above the third folding platform 122 in a substantially parallel and spaced manner.

Figure 11:
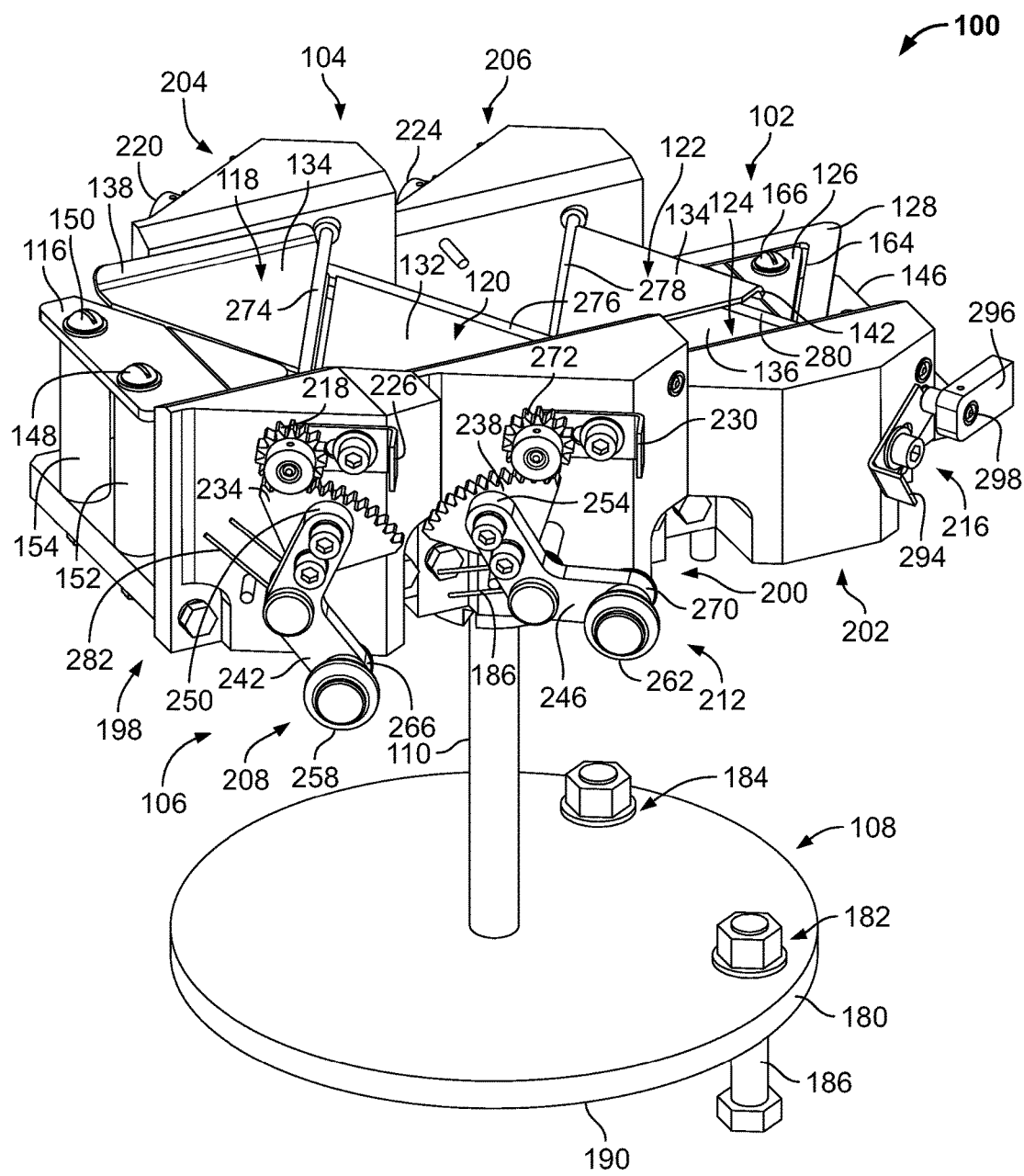
FIG. 11 is a perspective view of the first example embodiment of FIG. 1 including a third folding platform actuated into a third fold position.

FIG. 11 is a perspective view of the apparatus 100 with the third folding platform 122 actuated into a fold position (e.g., a third fold position). While the third folding platform 122 is in the fold position, the remaining folding platforms 118, 120, 124, 128 are in the unfolded position. As shown in FIG. 11, the actuator mechanism 212 has been actuated to rotate the actuator gear 238 from one end representing the unfolded position to the opposing end representing the fold position. In the third fold position, the third folding platform 122 can rotate to be disposed above the fourth folding platform 124 in a substantially parallel and spaced manner. As noted above, in some embodiments, after the third fold has been created in the food product, the filling can be completely sealed within the folded food product and additional folds are not necessary.

Figure 12:
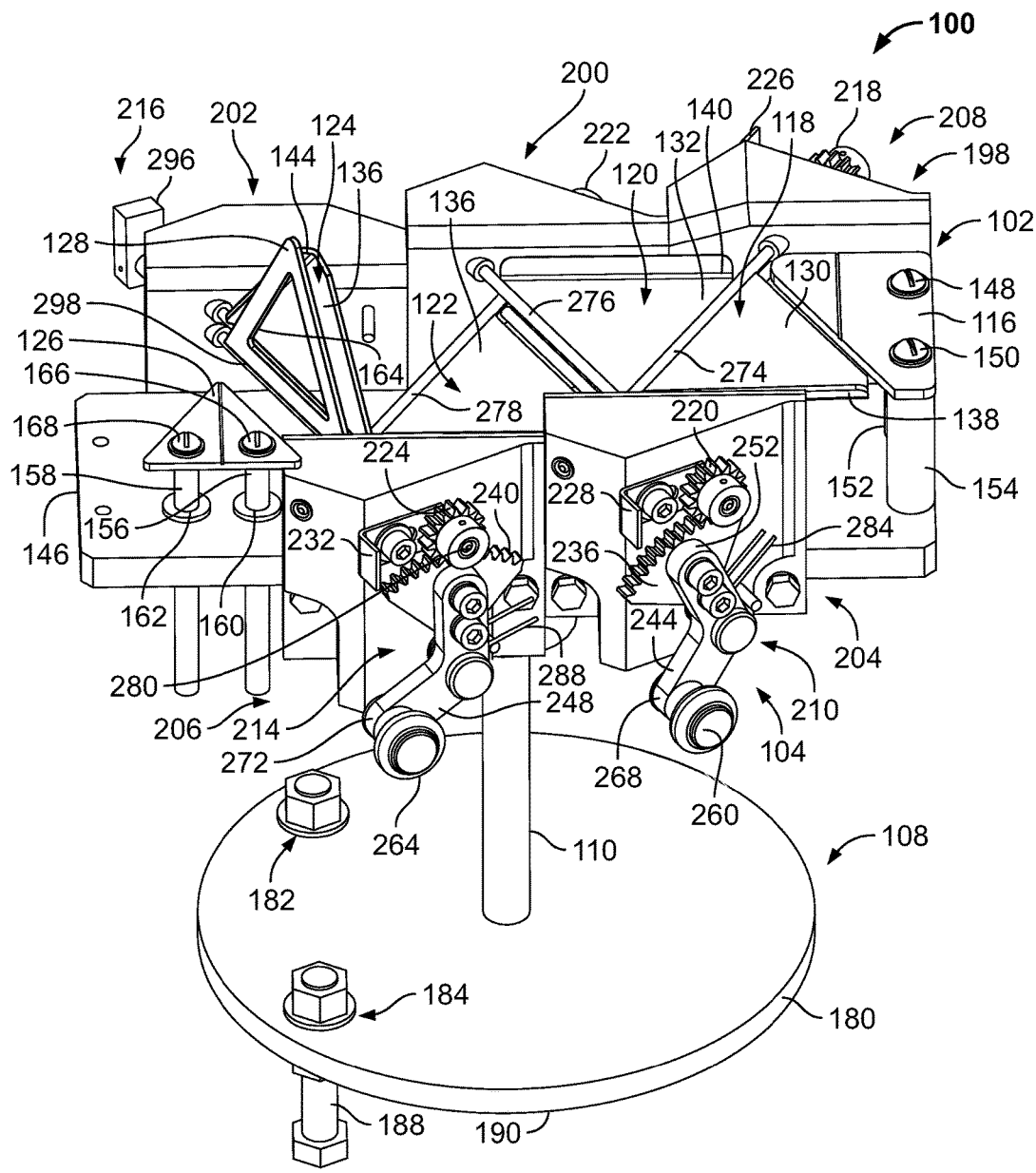
FIG. 12 is a perspective view of the first example embodiment of FIG. 1 including a fourth folding platform actuated into a fourth fold position and a fifth folding platform actuated into a fifth fold position.

In some embodiments, additional folds of the food product can be made. For example, FIG. 12 is a perspective view of the apparatus 100 with the fourth and fifth folding platforms 124, 128 actuated into fold positions (e.g., fourth and fifth fold positions, respectively). While the fourth and fifth folding platforms 124, 128 are in the fold position, the remaining folding platforms 118-122 are in the unfolded position. As shown in FIG. 12, the actuator mechanism 214 has been actuated to rotate the actuator gear 240 from one end representing the unfolded position to the opposing end representing the fold position. The actuator mechanism 216 has simultaneously been actuated to rotate the actuator bar 296 counterclockwise. In the fourth and fifth fold positions, the fourth and fifth folding platforms 124, 128 can rotate toward each other into a substantially parallel and vertical position. In some embodiments, the fourth and fifth folding platforms 124, 128 can be actuated to rotate towards each other into a position where the fourth and fifth folding platforms 124, 128 are substantially parallel and angled in the direction of the bottom unloading platform 126. With the angled position, upon return of the fourth and fifth folding platforms 124, 128 into the unfolded positions, the folded food product can be lowered onto the bottom unloading platform 126 due to gravity.

Figure 13:
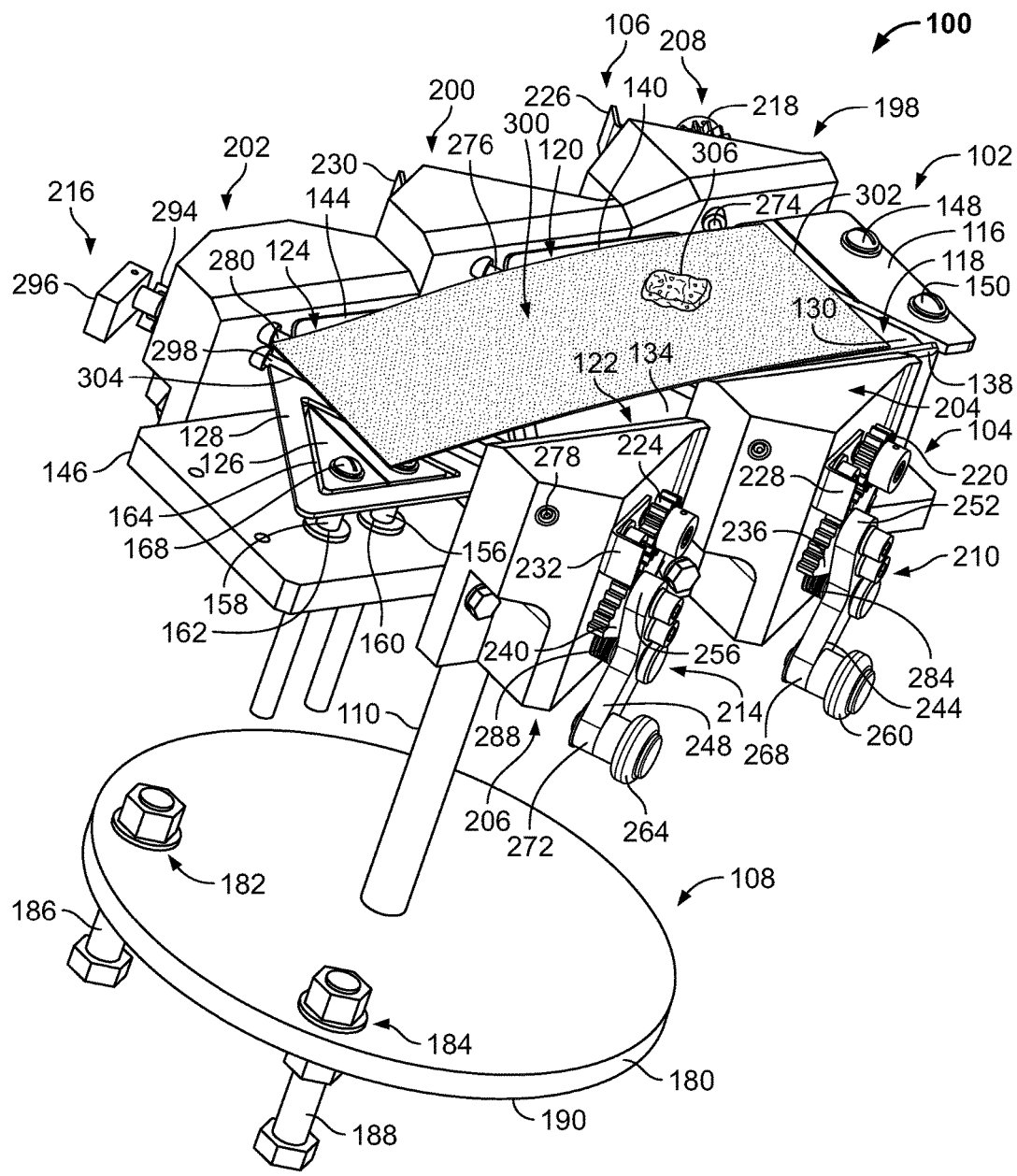
FIG. 13 is a perspective view of the first example embodiment of FIG. 1 including a food product.

FIG. 13 is a perspective view of the apparatus 100 including a food product 300 disposed on the folding section 102. Initially, the food product 300 can be positioned on the folding section 102 via manual means or a conveyor belt configured to carry the food product 300 to the folding section 102. The food product 300 can be in the form of a substantially rectangular and planar sheet (e.g., a sheet of dough) configured to be folded into a triangular folded food product. The food product dough can be for a samosa or spanakopita, for example. The food product 300 includes a proximal end 302 and a distal end 304 on opposing sides of the food product 300.

After being positioned on the folding section 102, a filling 306 to be wrapped in the food product 300 can be deposited on the unfolded food product 300. In some embodiments, the filling 306 can be added manually. In some embodiments, the filling 306 can be added to the food product 300 via mechanical means, such as a filling ejector positioned over the food product. The filling 306 can be positioned at a location between the proximal and distal ends 302, 304 of the food product 300 and, preferably, between the midpoint and the proximal end 302 of the food product 300.

Figure 14:
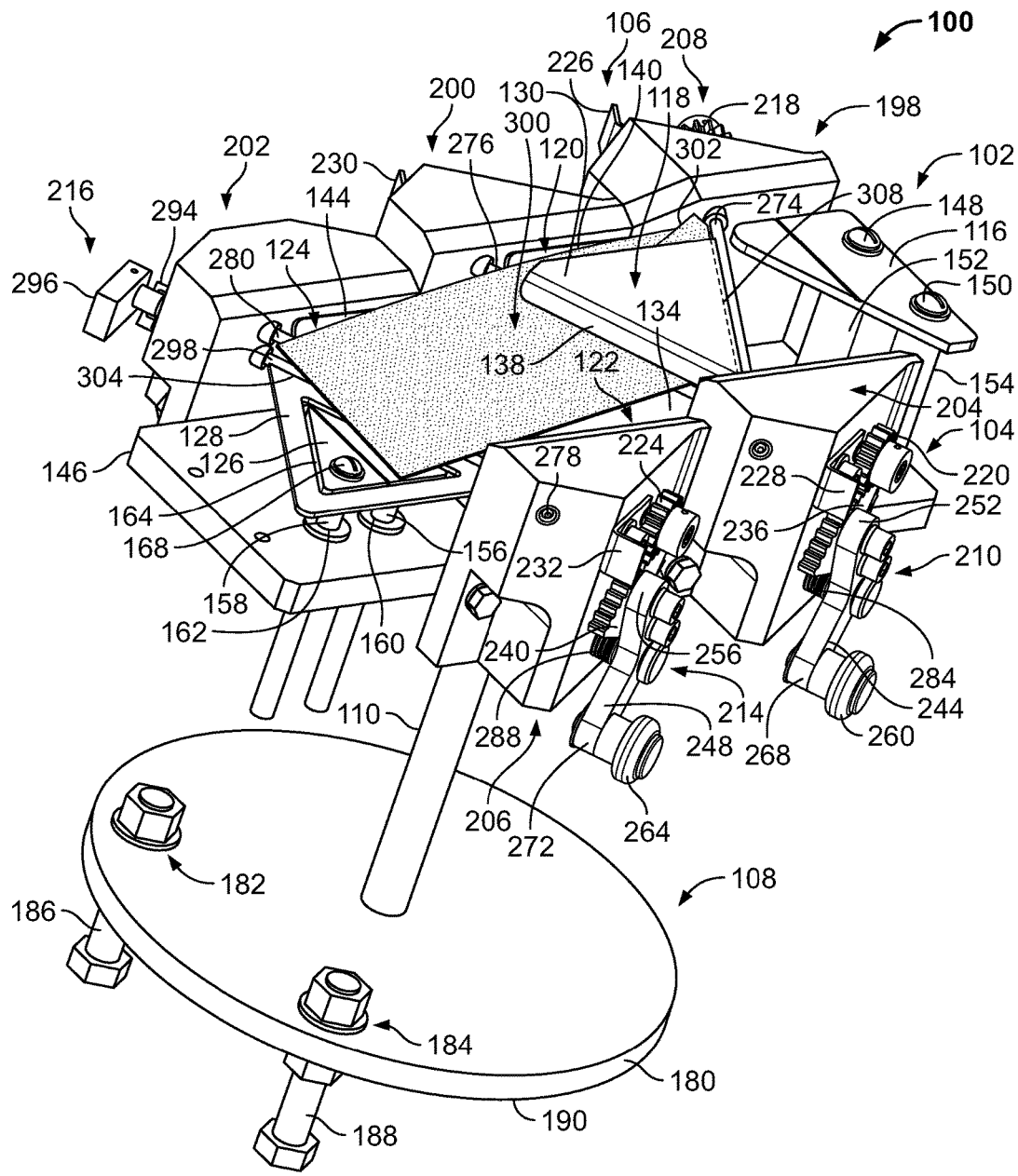
FIG. 14 is a perspective view of the first example embodiment of FIG. 1 including a food product and a first folding platform actuated into a first fold position.

FIGS. 14-17 show the different actuation stages of the apparatus 100 for folding the food product 300. The different actuation stages occur sequentially. For example, FIG. 14 is a perspective view of the apparatus 100 with the first folding platform 118 actuated into the first fold position, thereby creating a first fold 308 of the food product 300. As noted above, due to the staggered elevation of the folding platforms 118-124, 128, as the first fold 308 is created, the partially folded food product 300 is pushed to the second folding platform 120. Further, due to the staggered elevation between the first and second folding platforms 118, 120, clearance remains to compensate for the thickness of the partially folded food product 300 due to the filling 306. Further still, due to the staggered elevation between the first and second folding platforms 118, 120, the first fold 308 defines a rounded edge.

Figure 15:
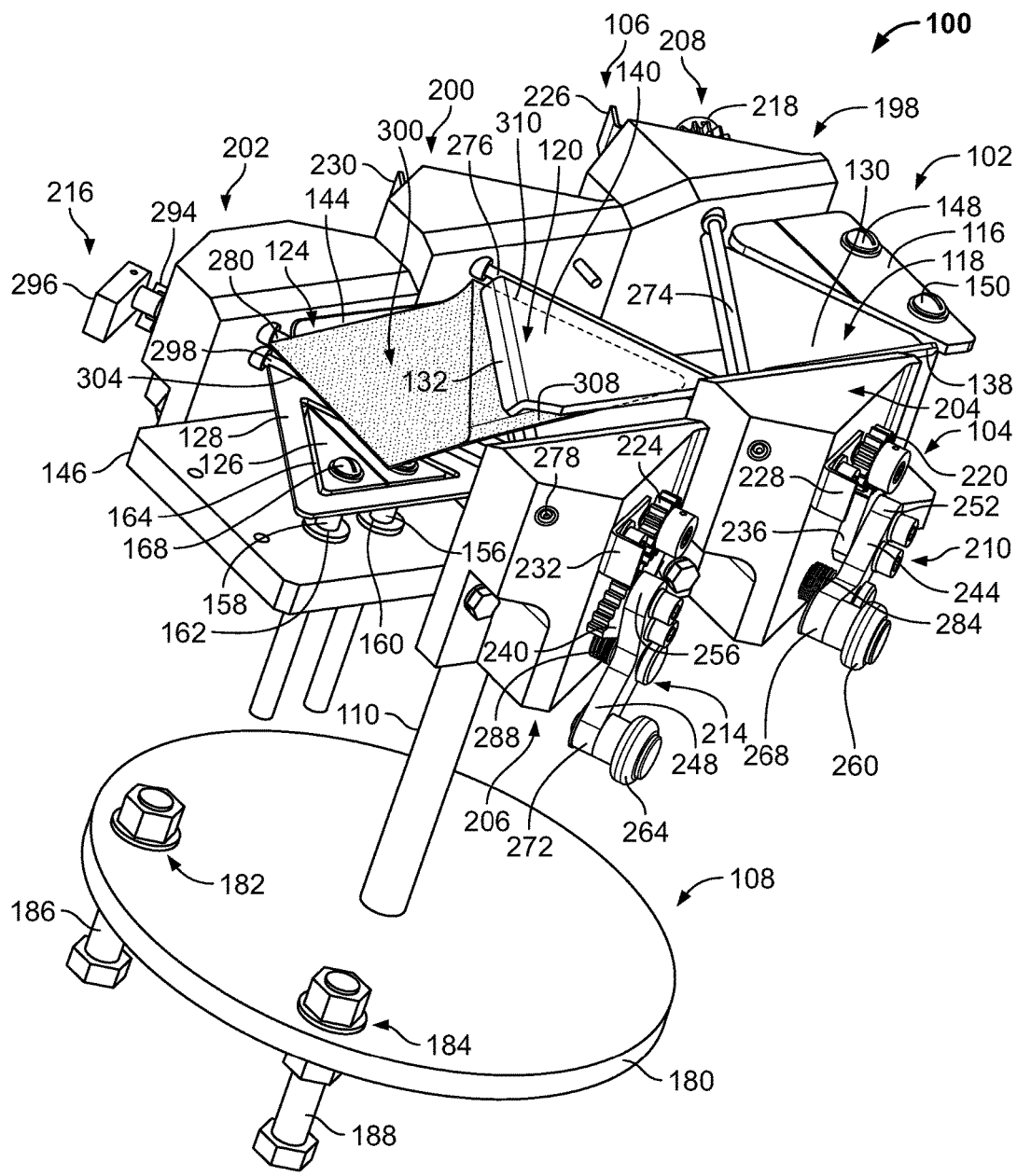
FIG. 15 is a perspective view of the first example embodiment of FIG. 1 including a food product and a second folding platform actuated into a second fold position.

FIG. 15 is a perspective view of the apparatus 100 with the second folding platform 120 actuated into the second fold position, thereby creating a second fold 310 of the partially folded food product 300. Due to the staggered elevation of the second and third folding platforms 120, 122, as the second fold 310 is created, the partially folded food product 300 is pushed to the third folding platform 122 while maintaining the thickness of the partially folded food product 300. Further, due to the staggered elevation between the second and third folding platforms 120, 122, the second fold 310 defines a rounded edge.

Figure 16:
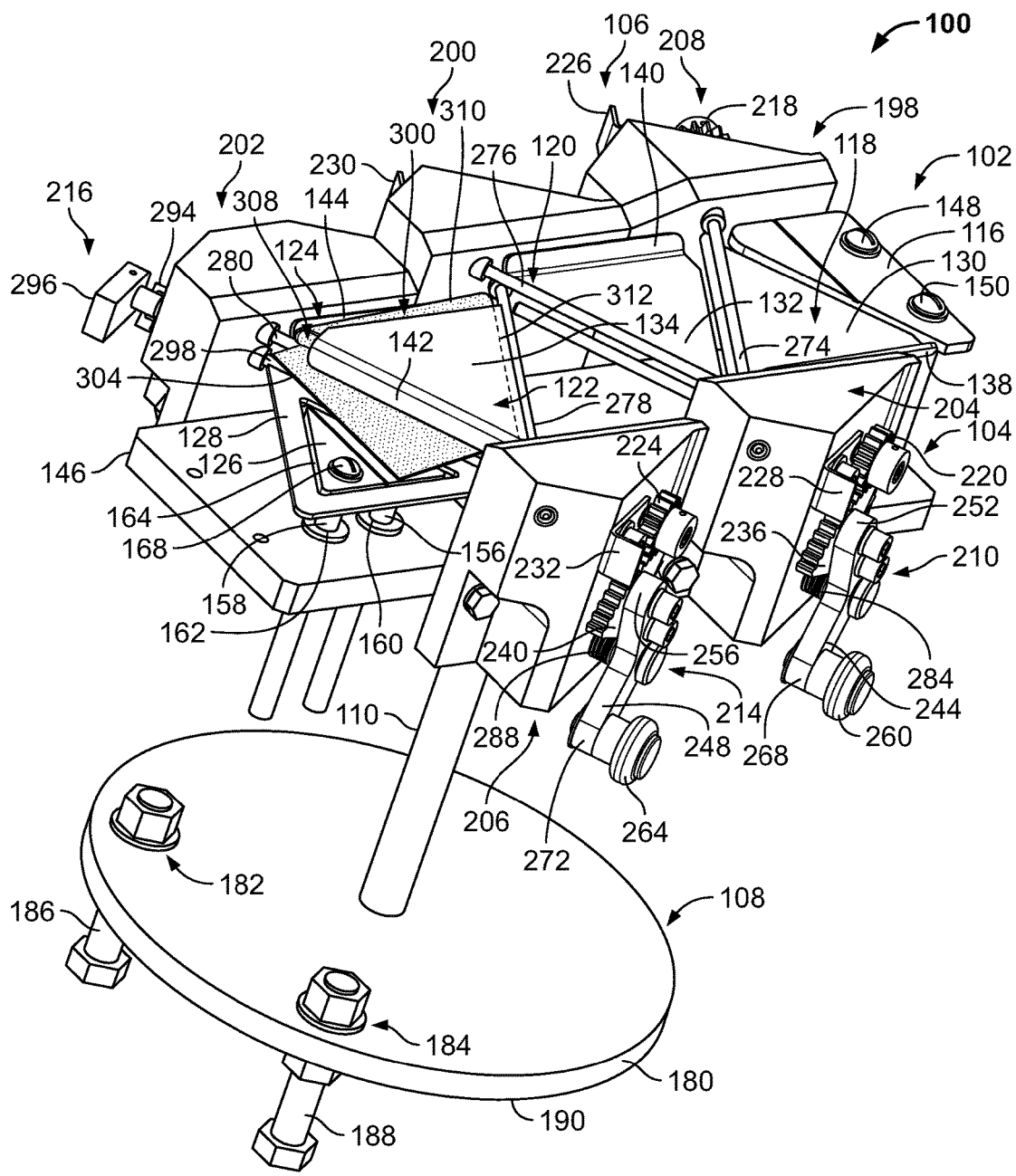
FIG. 16 is a perspective view of the first example embodiment of FIG. 1 including a food product and a third folding platform actuated into a third fold position.

FIG. 16 is a perspective view of the apparatus 100 with the third folding platform 122 actuated into the third fold position, thereby creating a third fold 312 of the partially folded food product 300. Due to the staggered elevation of the third and fourth folding platforms 122, 124, as the third fold 312 is crated, the partially folded food product 300 is pushed to the fourth folding platform 124 while maintaining the thickness of the partially folded food product 300. Further, due to the staggered elevation between the third and fourth folding platforms 122, 124, the third fold 312 defines a rounded edge. As noted above, in some embodiments, after the third fold 312 has been created, the filling 306 can be completely sealed within the folded food product 300, and the folded food product 300 can be discharged from the apparatus 100 for packaging. For example, the unfolded food product 300 can be configured such that after three folds have been created, there are no remaining flaps in the food product 300 that need to be further folded on the food product 300 to complete the folding process.

Figure 17:
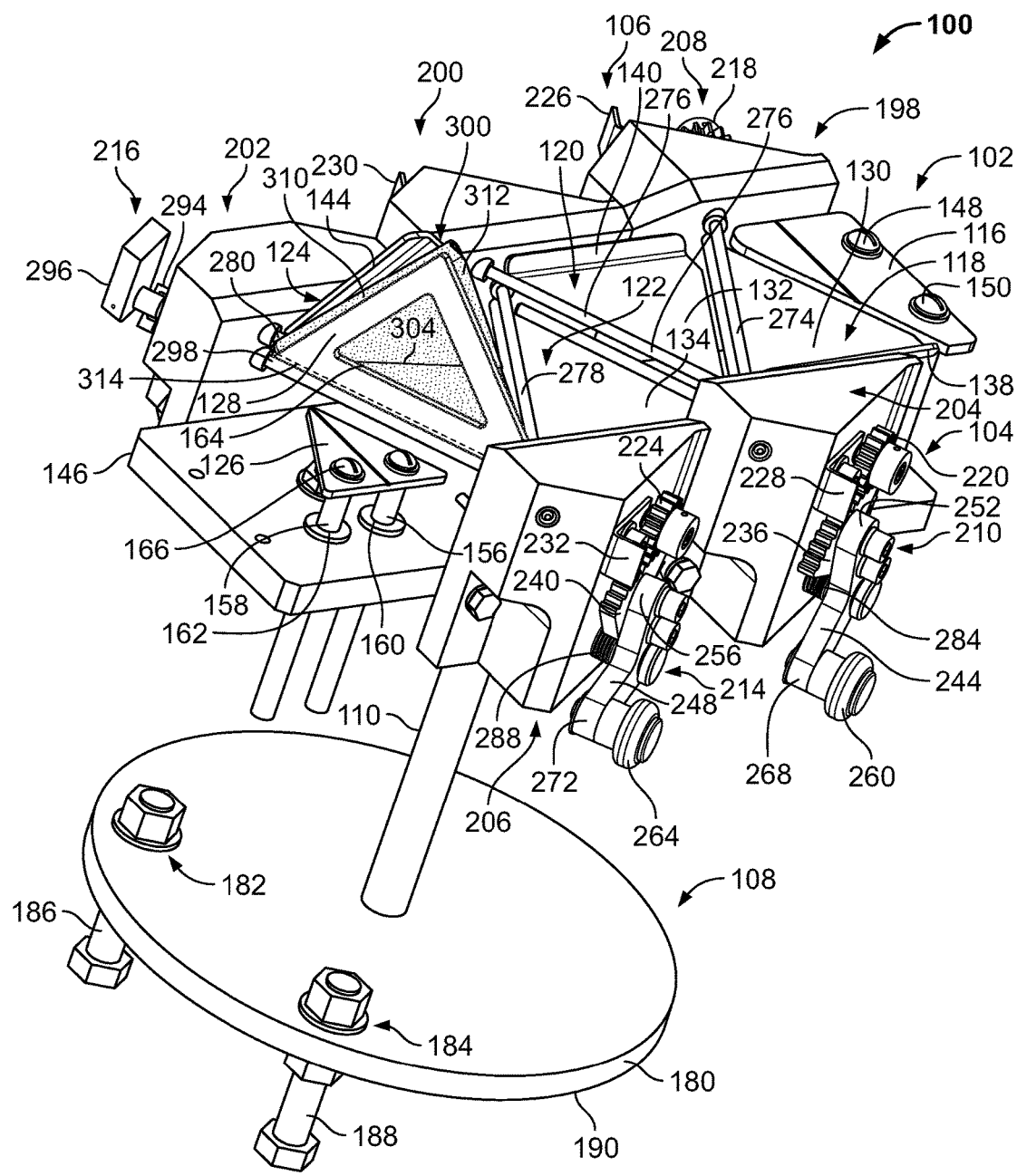
FIG. 17 is a perspective view of the first example embodiment of FIG. 1 including a food product, a fourth folding platform actuated into a fourth fold position and a fifth folding platform actuated into a fifth fold position.
Figure 18:
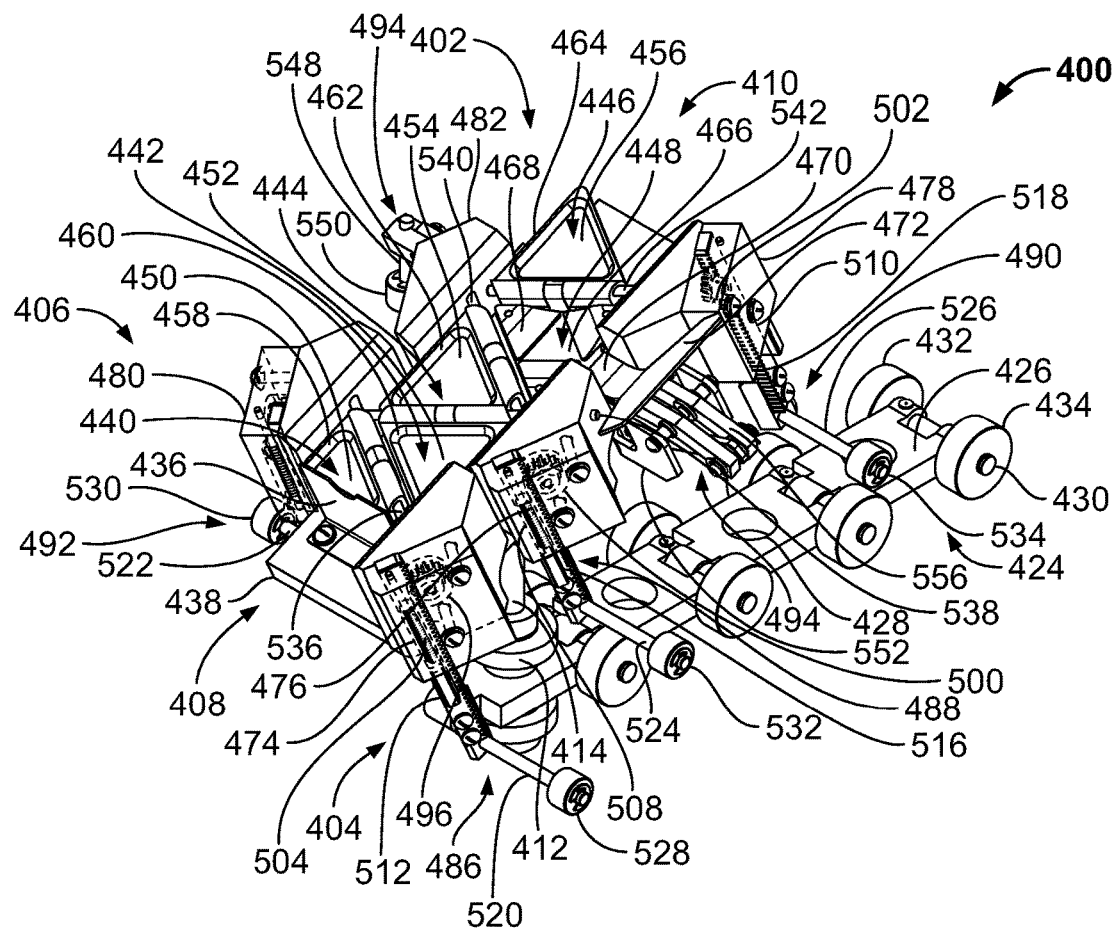
FIG. 18 is a right, front perspective view of a second example embodiment of a food product folding apparatus according to the present disclosure.
Figure 19:
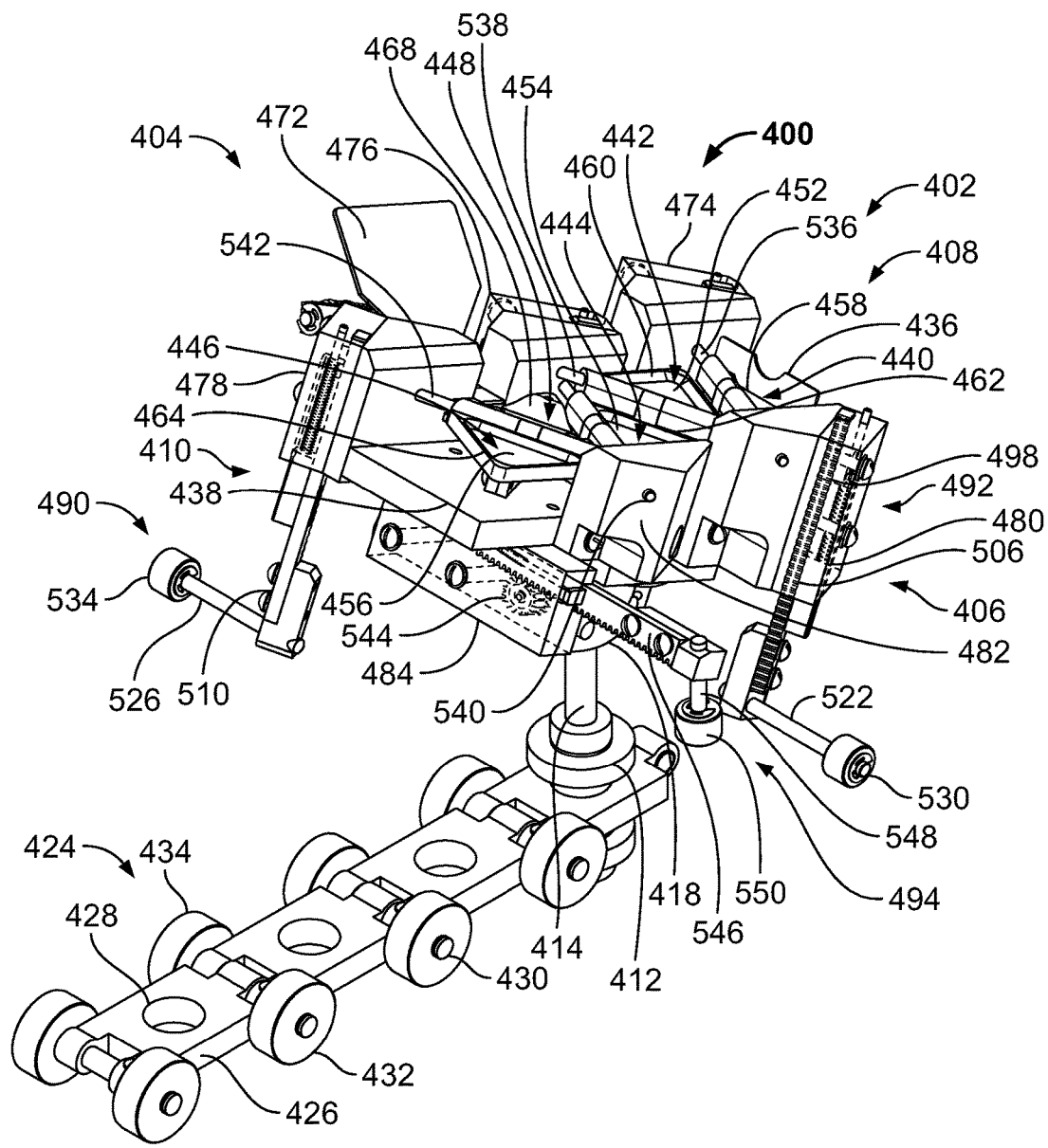
FIG. 19 is a left, rear perspective view of the second example embodiment of FIG. 18.
Figure 20:
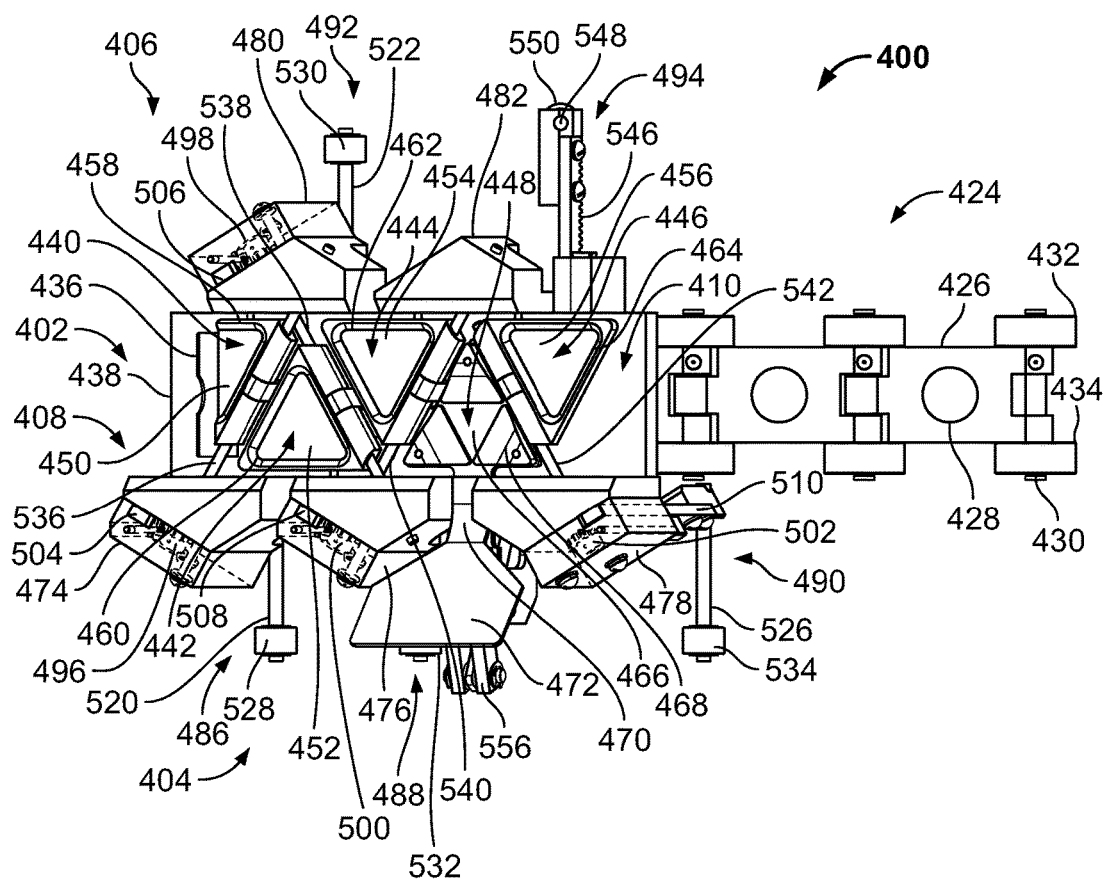
FIG. 20 is a top view of the second example embodiment of FIG. 18.
Figure 21:
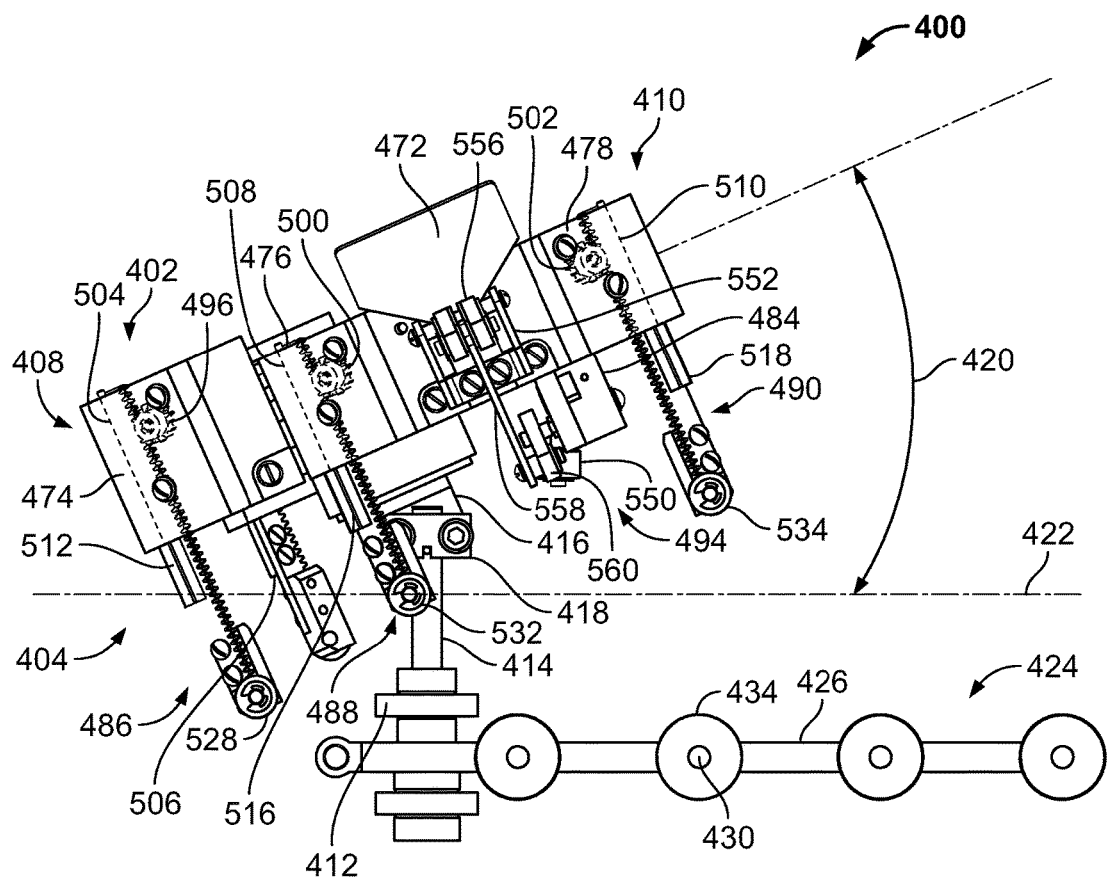
FIG. 21 is a side view of the second example embodiment of FIG. 18.
Figure 22:
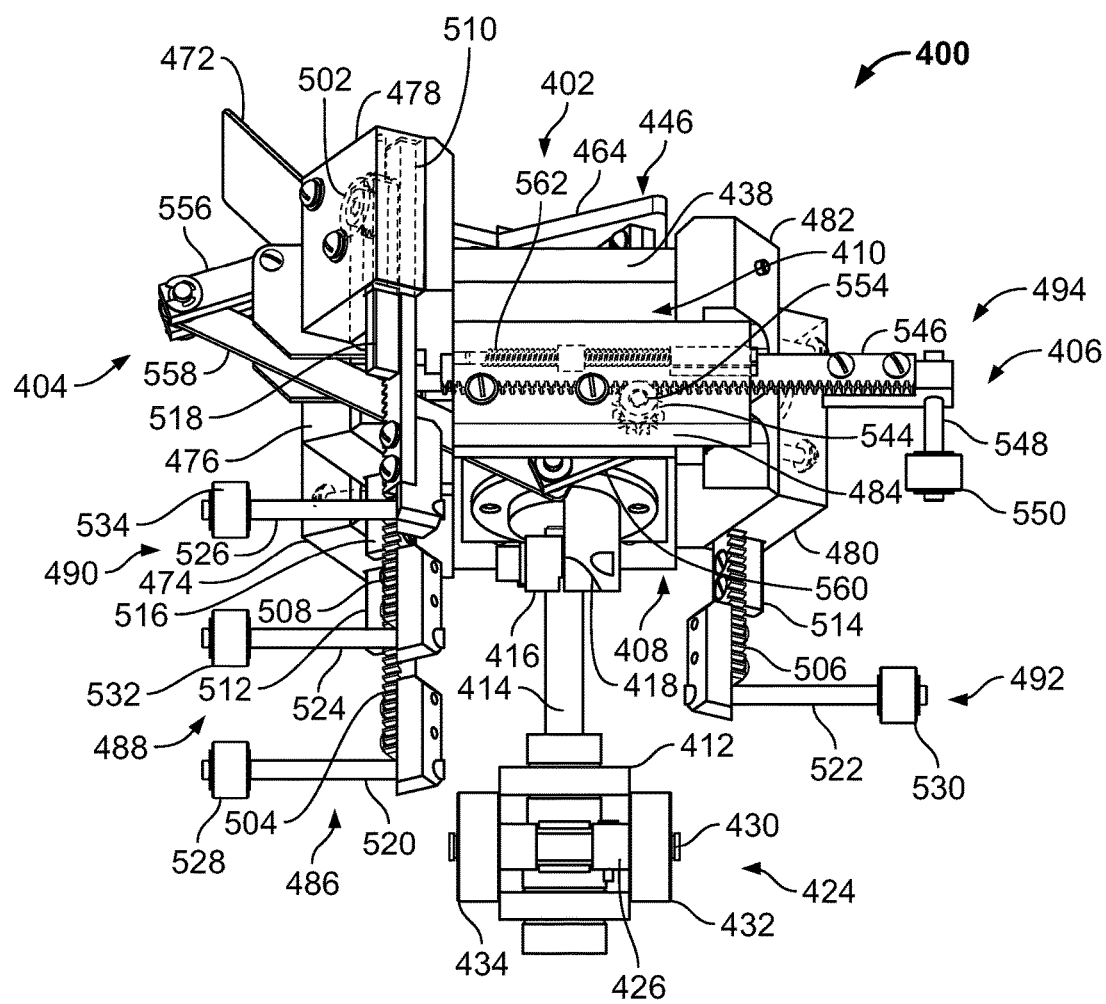
FIG. 22 is a rear view of the second example embodiment of FIG. 18.
Figure 23:
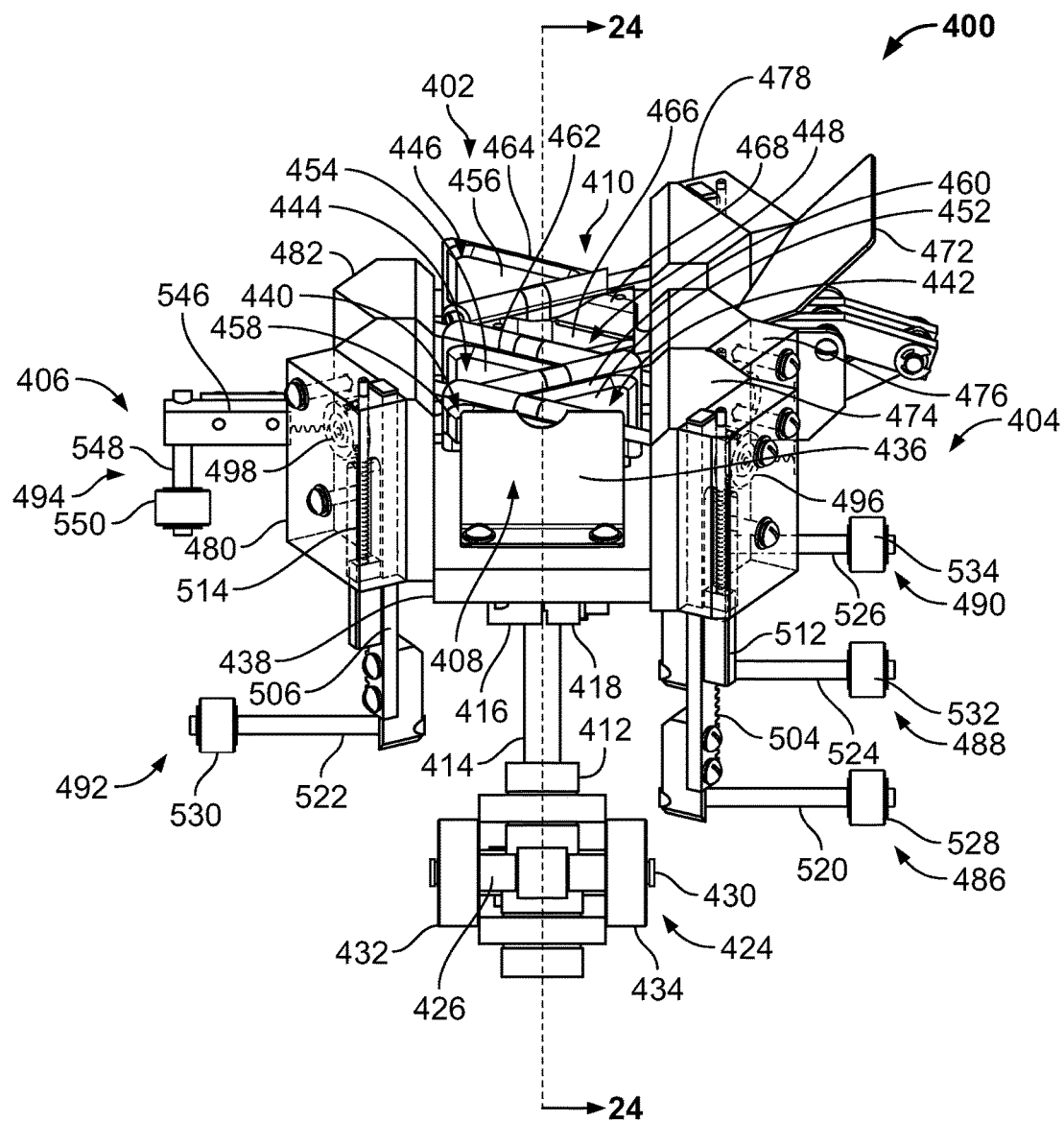
FIG. 23 is a front view of the second example embodiment of FIG. 18.

In some embodiments, additional folds can be created in the folded food product 300 to fold a flap remaining in the food product after the third fold 312. For example, FIG. 17 is a perspective view of the apparatus 100 with the fourth and fifth folding platforms 124, 128 actuated into the fourth and fifth fold positions, thereby creating a fourth fold 314 and completing folding of the food product 300. In particular, the fourth and fifth folding platforms 124, 128 are actuated toward each other to sandwich the food product 300 therebetween. While the fourth folding platform 124 creates the fourth fold 314, the fifth folding platform 128 ensures that the distal end 304 of the food product 300 is securely pressed against the remaining portion of the food product 300 to prevent unfolding of the food product 300. Due to the thickness of the food product 300, the fourth and fifth folding platforms 124, 128 form a fourth fold 314 with a rounded edge. In some embodiments, four or more folds can be created in the food product 300 prior to reaching the fifth folding platform 128. Thus, in some embodiments, the apparatus 100 can include four or more folding platforms to create four or more folds in the food product 300. After folding of the food product 300, the triangular folded food product 300 can be lowered onto the bottom unloading platform 126 as the fifth folding platform 128 is returned to the unfolded position (e.g., substantially parallel with the bottom unloading platform 126). The folded food product 300 can be removed from the apparatus 100 manually or via a conveyor belt. After removal of the folded food product, a new unfolded food product 300 can be disposed on the folding section 102 to initiate folding of a subsequent food product 300.

With reference to FIGS. 18-24, perspective, top, side, rear, front and cross-sectional views of a second embodiment of a food product folding apparatus 400 (hereinafter "apparatus 400"), e.g., a triangular food product folding apparatus, are provided. The apparatus 400 folding section 402, a right side actuation section 404 (e.g., a first actuation section) disposed on the right side of the folding section 402, and a left side actuation section 406 (e.g., a second actuation section) disposed on the left side of the folding section 404. As will be discussed below, the apparatus 400 includes a front end 408 and a rear end 410, with folding of the triangular food product initiating at the front end 408 and ending at or near the rear end 410.

The apparatus 400 includes a base 412 and a support rod 414 connecting the base 412 to the bottom of the folding section 402. In particular, the bottom of the folding section 402 includes mounting flange 416 and the top of the support rod 414 includes a coupling flange 418 configured to couple to the mounting flange 416. Engagement of the mounting flange 416 with the coupling flange 418 allows for customization of the angle 420 of the folding section 402 relative to the conveyor system along which the apparatus 400 travels (e.g., relative to horizontal 422). The angle 420 can be selected such that the rear end 410 of the apparatus 400 is higher from horizontal 422 than the front end 408. In some embodiments, the angle 420 can be between approximately 10-40 degrees, approximately 20-30 degrees, approximately 25 degrees, or the like. The angle 420 tilts the folding section 402, using gravity to minimize shifting of the food product between the sequential folding operations in the staggered folding platforms.

The base 412 can be coupled to a support surface or transport means, such as conveyor system 424, that can be used to transport the apparatus 400 along a conveyor line such that peaks and valleys of tracks, such as tracks 112, 114 (or any similar actuation structures), actuate components of the apparatus 400 to fold the food product. In some embodiments, the conveyor system 424 can include multiple individual blocks 426 configured to be detachably coupled to each other. Each of the blocks 426 includes an aperture 428 through which the support rod 414 can pass to couple the base 412 to the respective block 426. The desired spacing between each apparatus 400 in the conveyor system 424 can therefore be customized. The blocks 426 can be coupled by axles 430, the axle 430 including wheels 432, 434 on opposing sides. The wheels 432, 434 allow the blocks 426 to travel along a conveyor surface to slide the actuator arms of the apparatus 400 along the peaks and valleys of the tracks.

The apparatus 400 includes a barrier 436 mounted to a structural block 438 at the front end 408 of the folding section 402. The barrier 436 extends over the plane of a first folding platform 440 to maintain the position of the unfolded food product on the folding section 402 prior to initiation of the folding sequence. For example, the barrier 436 prevents the unfolded food product from sliding off of the folding section 402 prior to initiation of the folding sequence. The folding section 402 includes the first folding platform 440, a second folding platform 442, a third folding platform 444, and a fourth folding platform 446 for folding the food product, and a fifth platform 448 (e.g., a discharge platform) for discharging the folded food product from the folding section 402. Using the folding platforms 440-446, a filling deposited on the food product can be completely sealed within the folded food product by creating four folds, and the platform 448 is used to dispense or discharge the folded food product from the folding section 402.

Each of the folding platforms 440-446 includes a planar portion 450-456 that defines a planar plate having a substantially triangular configuration. In some embodiments, the folding platform 440 can be in the shape of a scalene triangle. In some embodiments, the folding platforms 442-446 can be in the shape of an equilateral triangle. The surface area of the folding platform 440 can be dimensioned smaller than the surface area of the folding platforms 442-446. The folding platform 440 includes a raised section 458 along two of the perimeter edges of the folding platform 440, resulting in the planar portion 450 being recessed relative to the raised section 458. The folding platforms 442-446 include a raised section 460-464 along each of the three perimeter edges, resulting in the planar portions 452-456 being recessed relative to the raised sections 460-464. The raised sections 458-464 assist in maintaining the position of the food product at each of the sequential folding steps, while the recessed planar portions 450-456 accommodate the thickness of the food product as the thickness increases with each fold. In some embodiments, the raised sections 456-464 can be tapered such that the opening leading to the planar portions 450-456 is dimensioned greater than the planar portions 450-456.

The platform 448 includes a planar portion 466 that defines a planar plate having a substantially triangular configuration. In some embodiments, the platform 448 can be in the shape of an equilateral triangle. The elevation of the planar portion 466 can be below the elevation of the planar portions 454, 456 of the folding platforms 444, 446. The platform 448 includes a raised section 468 at each of the corners. In some embodiments, the planar portion 466 and the raised sections 468 can be formed from a single part. In some embodiments, the planar portion 466 and the raised sections 468 can be formed from different parts, and the raised sections 468 can be mounted to the planar portion 466. The raised sections 468 can be configured as equilateral triangles, thereby forming an equilateral triangle in the middle of the planar portion 466 between the raised sections 468. The platform 448 includes a curved protrusion 470 extending outwardly away from the folding section 402 from one of the edges of the planar portion 466. The curved protrusion 470 connects to a substantially planar tilt plate 472. As will be discussed below, the curved protrusion 470 and tilt plate 472 assist in rotating the platform 448 in a curved manner to discharge the folded food product from the folding section 402.

Figure 24:
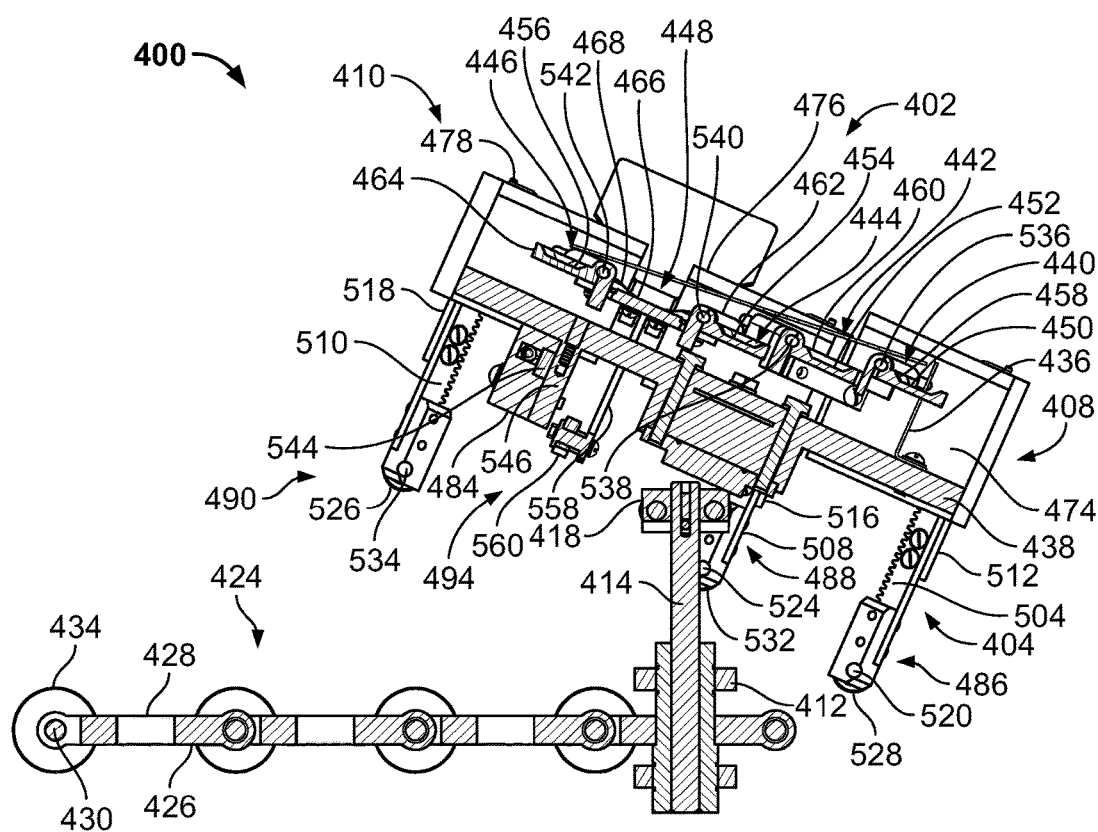
FIG. 24 is a cross-sectional view of the second example embodiment of FIG. 18 taken along section line 24-24.

As shown in FIG. 24, the planar portions 450-456, 466 of the platforms 440-448 can extend in substantially parallel directions. However, the pivot axes of the platforms 440-446 are staggered in height relative to each other by a vertical space or height. The staggered elevation between the platforms 440-446 in conjunction with the angle 420 of the folding section 402 allows for sequential folding of the food product without undesired shifting of the food product on the folding section 402.

The right side actuation section 404 includes a first actuator block 474, a third actuator block 476 and a fourth actuator block 478. The left side actuation section 406 includes a second actuator block 480 and an axle supporting block 482. The apparatus 400 includes a fifth actuator block 484 disposed below the structural block 438 and between the right and left side actuation sections 404, 406. Each of the actuator blocks 474-480, 484 includes a respective actuator mechanism 486-492. The actuator mechanism 486 can be configured to actuate rotation of the first folding platform 440, the actuator mechanism 492 can be configured to actuate rotation of the second folding platform 442, the actuator mechanism 488 can be configured to actuate rotation of the third folding platform 444, the actuator mechanism 490 can be configured to actuate rotation of the fourth folding platform 446, and the actuator mechanism 494 can be configured to actuate rotation of the fifth platform 448 to discharge the folded food product from the folding section 402.

Each of the actuator mechanisms 486-494 can be in the form of a rack and pinion mechanism. However, it should be understood that the actuator mechanisms 486-494 can be replaced with gear/flange rotation actuator mechanisms (e.g., the actuator mechanisms of apparatus 100). In particular, actuator mechanisms 486-492 include an actuator cog or gear 496-502 rotatably mounted within the actuator blocks 474-480, and a geared track 504-510 meshing with the respective gear 496-502. The geared track 504-510 can be actuated to translate vertically within the actuator blocks 474-480, engagement of the geared track 504-510 with the gear 496-502 resulting in rotation of the gear 496-502. The actuator mechanisms 486-492 include a spring assembly 512-518 configured to provide a spring-loaded force to return the actuator mechanisms 486-492 to the normal position shown in FIGS. 18-24 after the respective folds have been performed. Each track 504-510 is coupled to an actuator bar 520-526 extending outwardly away from the folding section 402. Each actuator bar 520-526 includes a roller 528-534 rotatably mounted to the opposing end of the actuator bar 520-526.

As the apparatus 400 moves along the tracks 112, 114, engagement of the rollers 528-534 with the peaks 290 of the tracks 112, 114 sequentially lifts the tracks 504-510 which, in turn, results in rotation of the gears 496-502. Each gear 496-502 is associated with an axle 536-542 that is coupled to the respective folding platforms 440-446. Rotation of the gears 496-502 results in rotation of the folding platforms 440-446. In particular, rotation of the gear 496 results in rotation of the folding platform 440 over the folding platform 442 to make the first fold in the food product; rotation of the gear 498 results in rotation of the folding platform 442 over the folding platform 444 to make the second fold in the food product; rotation of the gear 500 results in rotation of the folding platform 444 over the platform 448 to make the third fold in the food product; and rotation of the gear 502 results in rotation of the folding platform 446 over the platform 448 to make the fourth fold in the food product. After the respective rollers 528-534 have passed the peaks 290 of the tracks 112, 114, the spring assembly 512-518 returns the tracks 504-510 to the normal (e.g., non-folding) position.

The actuator mechanism 494 includes a cog or gear 544 rotatably mounted within the actuator block 484 and a geared track 546 translatable within the actuator block 484 and engaged with the gear 544. The actuator mechanism 494 includes an actuator bar 548 extending from the track 546 and a roller 550 rotatably mounted to the end of the actuator bar 548. The roller 550 is configured to be actuated by peaks 190 in the tracks 112, 114. The actuator mechanism 494 includes a bracket 552 mounted to the support block 438 and a linkage assembly coupled to the bracket 552, the bottom of the platform 448, and an axle 554 coupled to the gear 544. The linkage assembly includes linkages 556 fixedly coupled to the bottom of the platform 448, and pivotally coupled to the bracket 552. The linkage assembly further includes a linkage 558 pivotally coupled to the linkage 556 at one end and pivotally coupled to a linkage 560 at an opposing end. The linkage 560, in turn, is pivotally coupled to the axle 554. Thus, as the roller 550 is actuated by peaks of a horizontally extending track similar to tracks 112, 114, translation of the geared track 546 results in rotation of the gear 544 which, in turn, results rotation of the linkages 556-560 to pivot the platform 448 into a discharge position (see, e.g., FIG. 29). After actuation, a spring assembly 562 within the actuator block 484 returns the geared track 546 to the normal position shown in FIGS. 18-24, thereby repositioning the platform 448 for folding and discharge of a subsequent food product.

Figure 25:
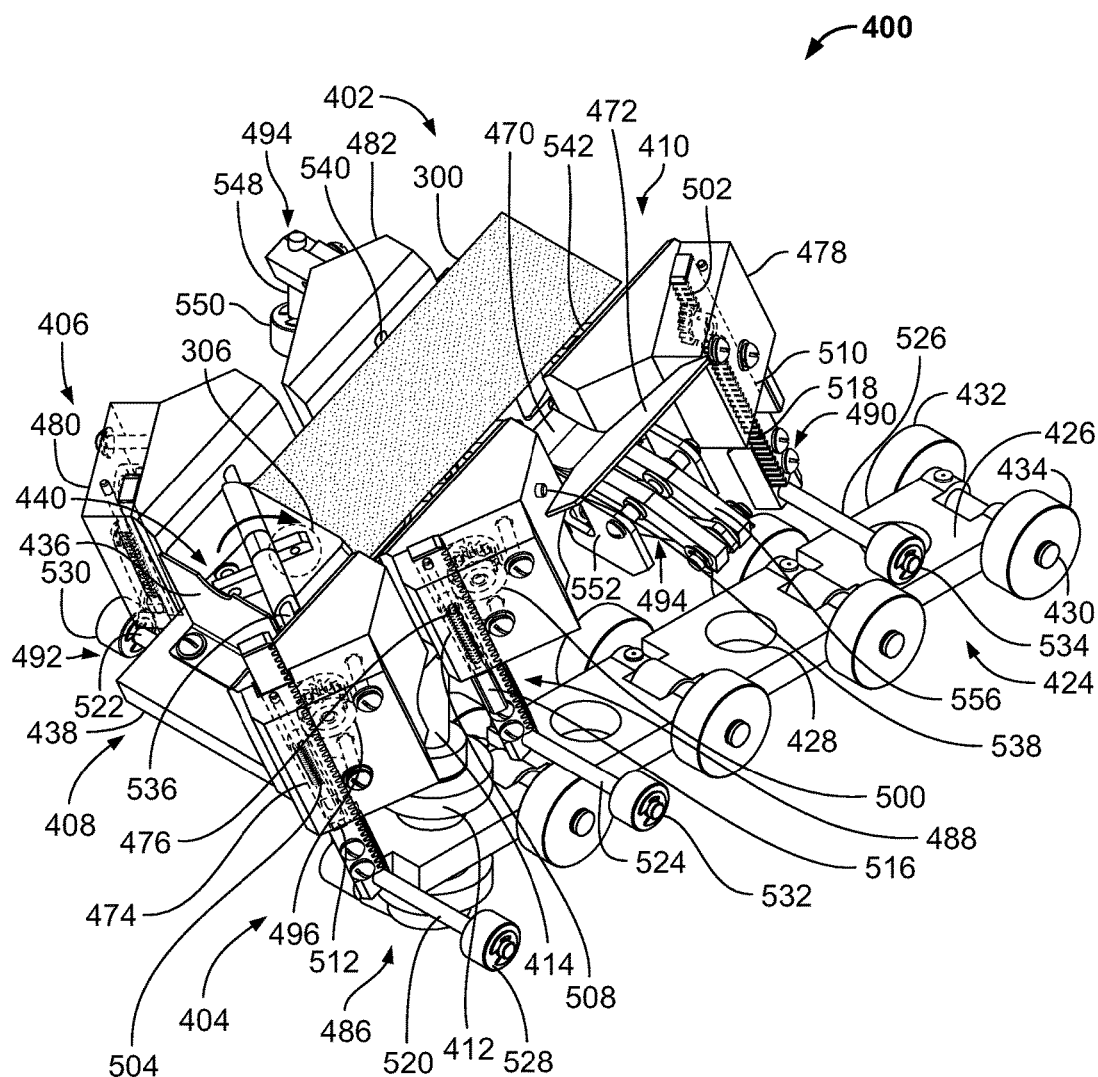
FIG. 25 is a perspective view of the second example embodiment of FIG. 18 including a food product and a first folding platform actuated into a first fold position.

FIG. 25 is a perspective view of the apparatus 400 with a food product 300 disposed on the folding section 402, and the first folding platform 440 actuated into a first fold position. In particular, while the first folding platform 440 is in the fold position, the remaining folding platforms 442-446 are in the unfolded position and the platform 448 is in a dough receiving position. As shown in FIG. 25, the actuator mechanism 486 has been actuated to lift the track 504 to rotate the gear 496, the track 504 extending from the top of the actuator block 474. Rotation of the gear 496 rotates the first folding platform 440 on top of the second folding platform 442 with the food product 300 sandwiched therebetween. By making the first fold of the food product 300, the food product 300 covers the filling 306.

Figure 26:
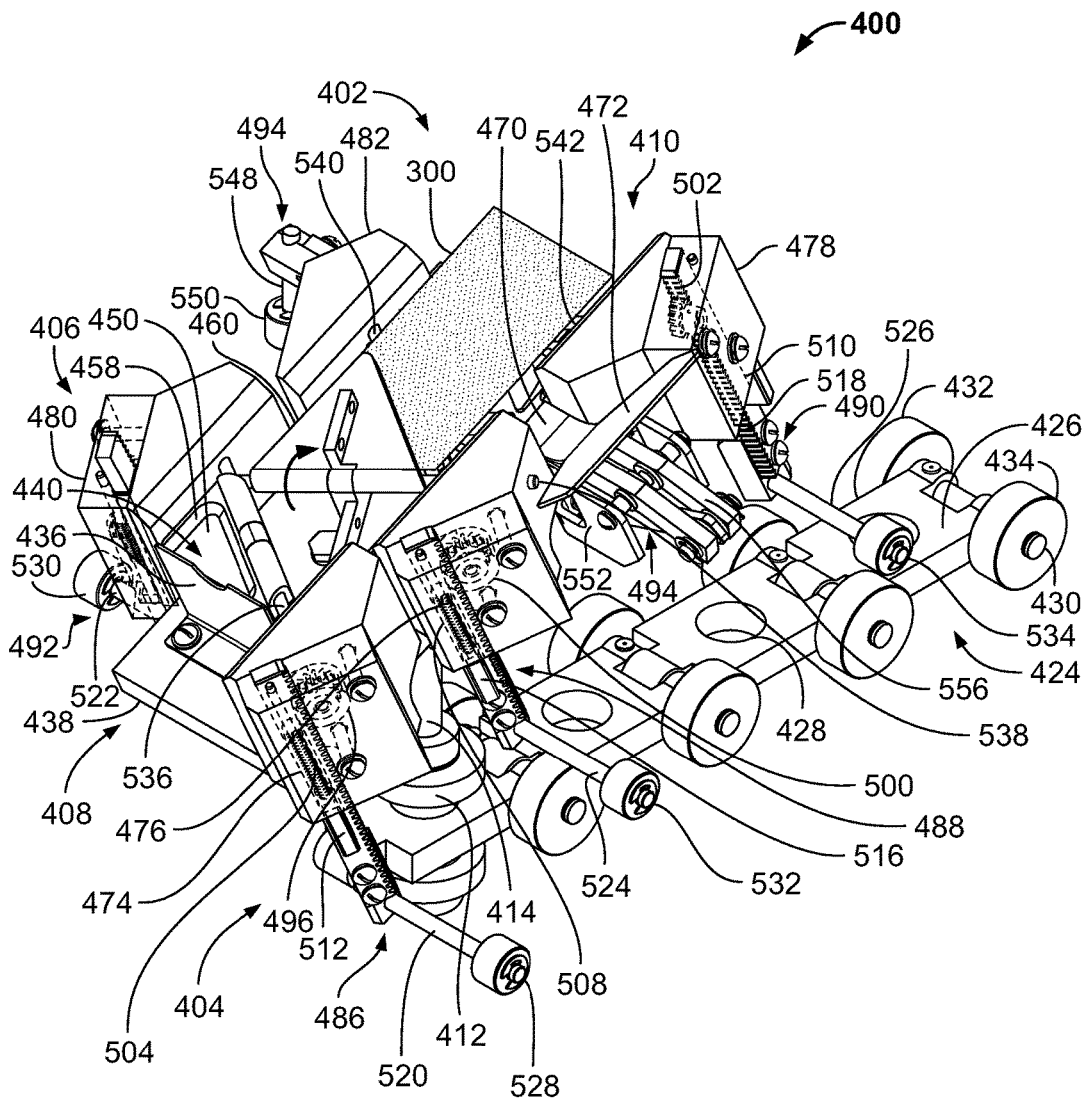
FIG. 26 is a perspective view of the second example embodiment of FIG. 18 including a food product and a second folding platform actuated into a second fold position.

FIG. 26 is a perspective view of the apparatus 400 with the second folding platform 442 actuated into a second fold position. While the second folding platform 442 is in the fold position, the remaining folding platforms 440, 444, 446 are in the unfolded position and the platform 448 is in the dough receiving position. As shown in FIG. 26, the actuator mechanism 492 has been actuated to lift the track 506 to rotate the gear 498, the track 506 extending from the top of the actuator block 480. Rotation of the gear 498 rotates the second folding platform 442 on top of the third folding platform 444 with the food product 300 sandwiched therebetween.

Figure 27:
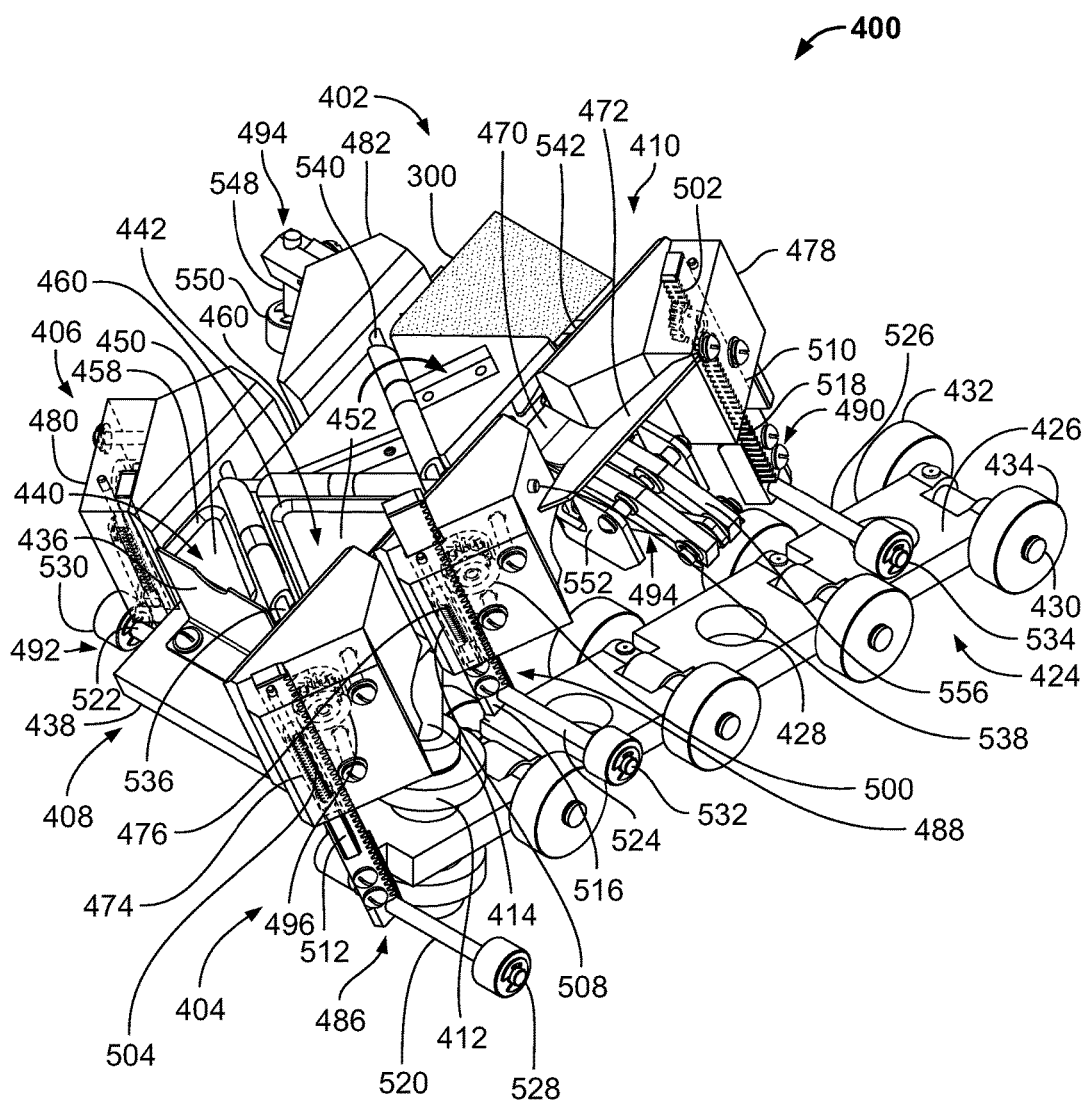
FIG. 27 is a perspective view of the second example embodiment of FIG. 18 including a food product and a third folding platform actuated into a third fold position.

FIG. 27 is a perspective view of the apparatus 400 with the third folding platform 444 actuated into a third fold position. While the third folding platform 444 is in the fold position, the remaining folding platforms 440, 442, 446 are in the unfolded position and the platform 448 is in the dough receiving position. As shown in FIG. 27, the actuator mechanism 488 has been actuated to lift the track 508 to rotate the gear 500, the track 508 extending from the top of the actuator block 476. Rotation of the gear 500 rotates the third folding platform 444 on top of the platform 448 with the food product 300 sandwiched therebetween.

Figure 28:
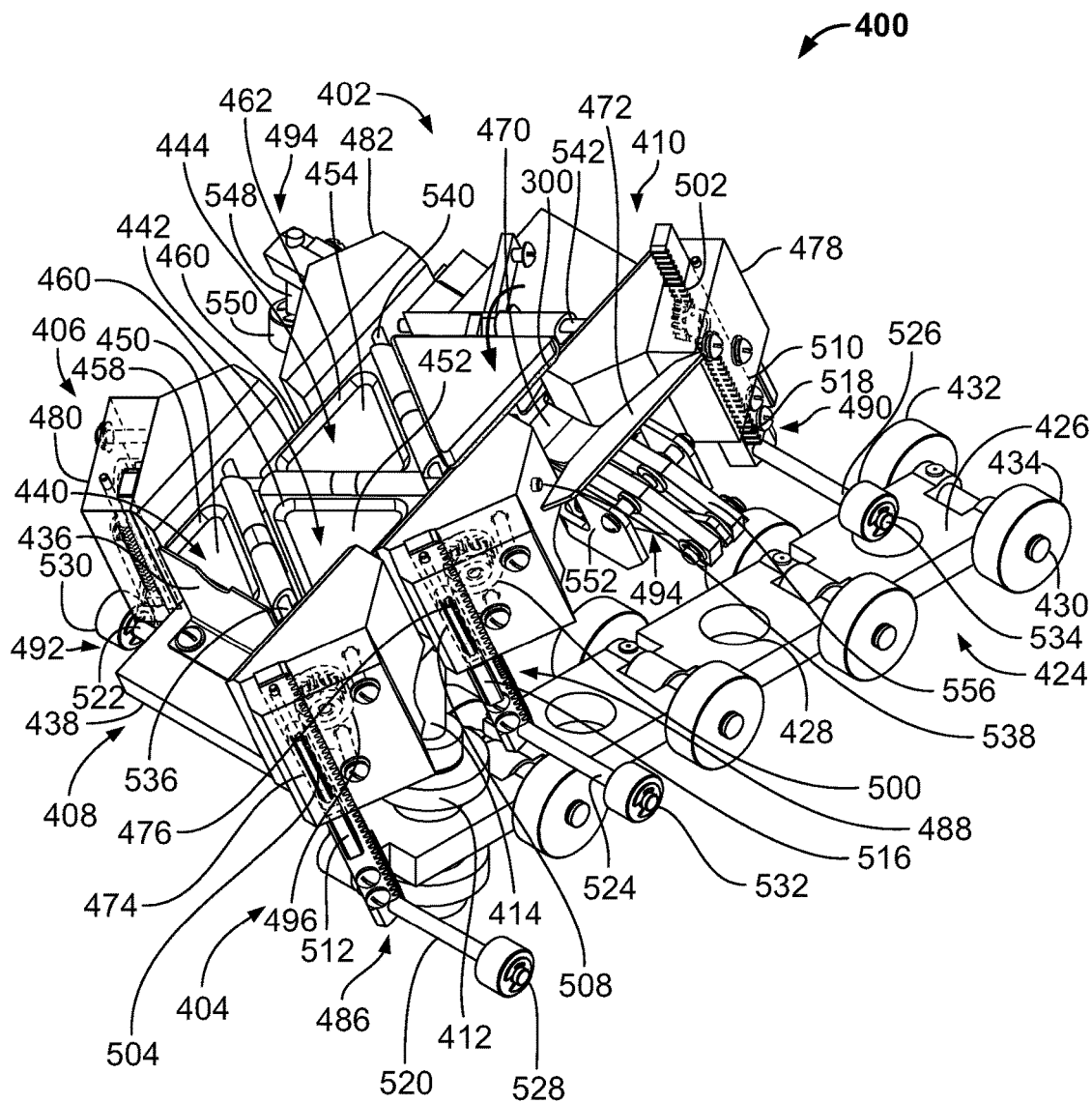
FIG. 28 is a perspective view of the second example embodiment of FIG. 18 including a food product and a fourth folding platform actuated into a fourth fold position.

FIG. 28 is a perspective view of the apparatus 400 with the fourth folding platform 446 actuated into a fourth fold position. While the fourth folding platform 446 is in the fold position, the remaining folding platforms 440-444 are in the unfolded position and the platform 448 is in the dough receiving position. As shown in FIG. 28, the actuator mechanism 490 has been actuated to lift the track 510 to rotate the gear 502, the track 510 extending from the top of the actuator block 478. Rotation of the gear 502 rotates the fourth folding platform 446 on top of the platform 448 (e.g., an opposing direction of folding from the other folding platforms 440-444) with the food product 300 sandwiched therebetween. The fourth folding platform 446 completes folding of the triangular food product 300.

Figure 29:
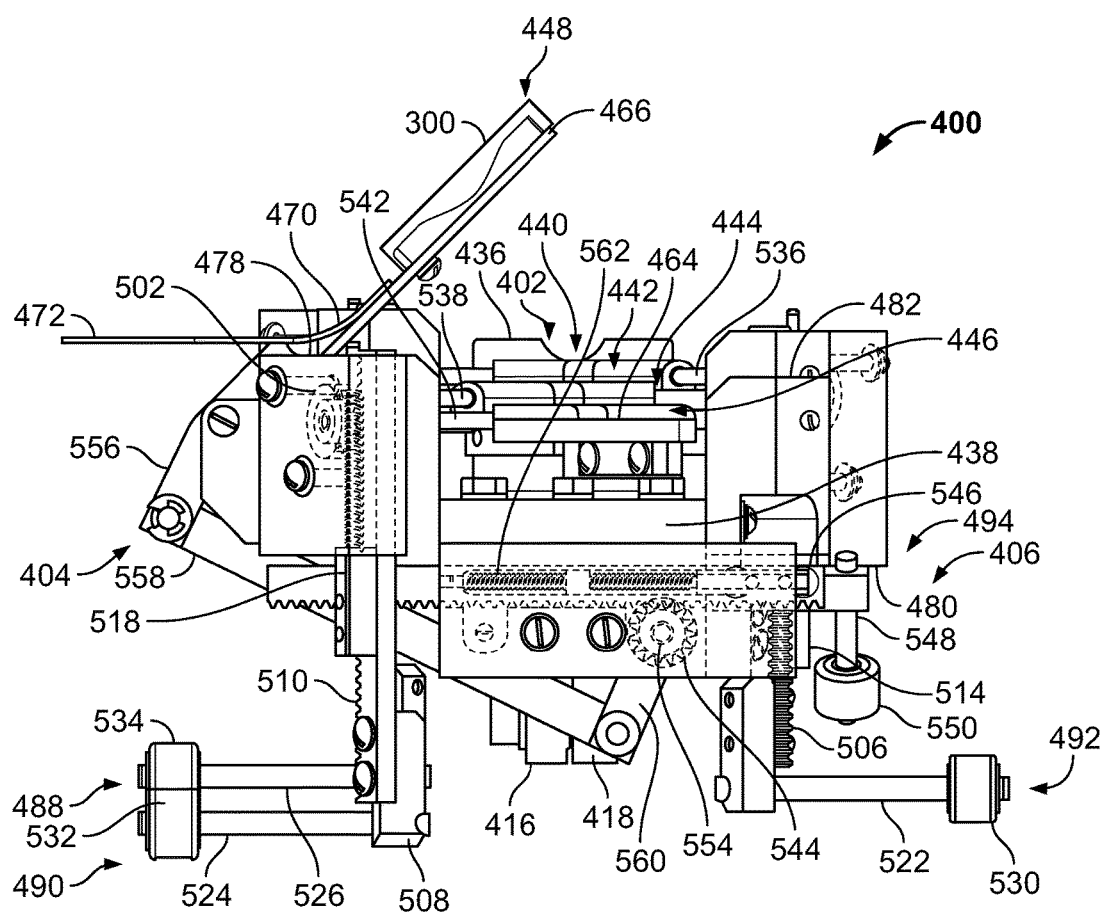
FIG. 29 is a side view of the second example embodiment of FIG. 18 including a food product discharged by a fifth platform actuated into a discharge position.
Figure 30:
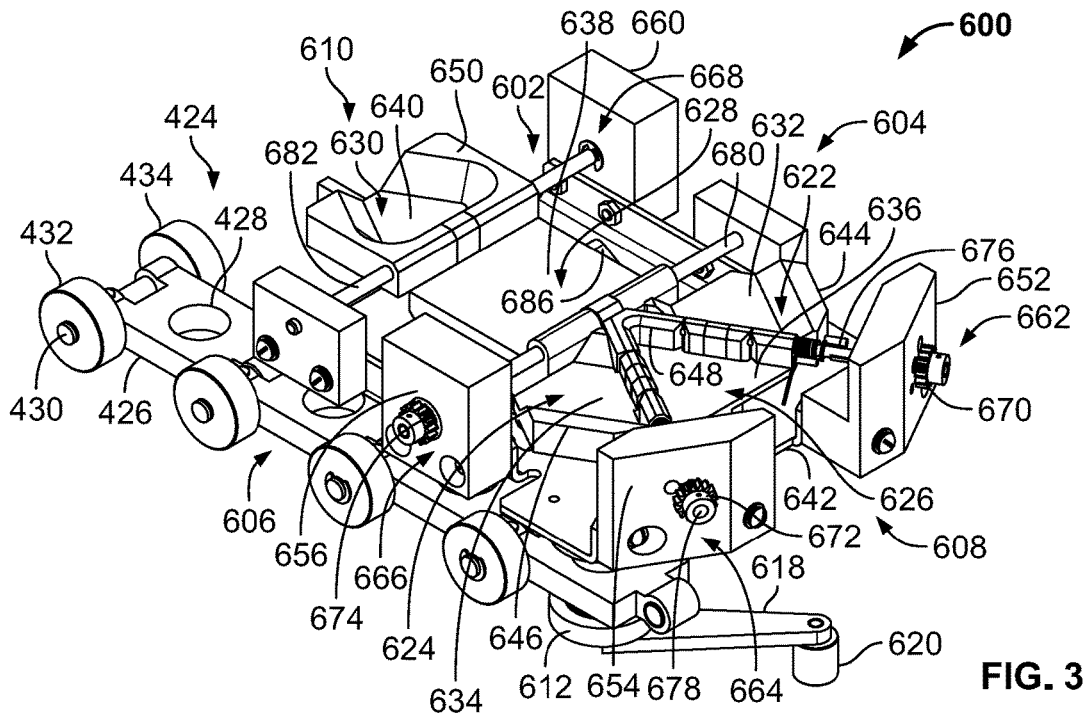
FIG. 30 is a left, front perspective view of a third example embodiment of a food product folding apparatus according to the present disclosure.
Figure 31:
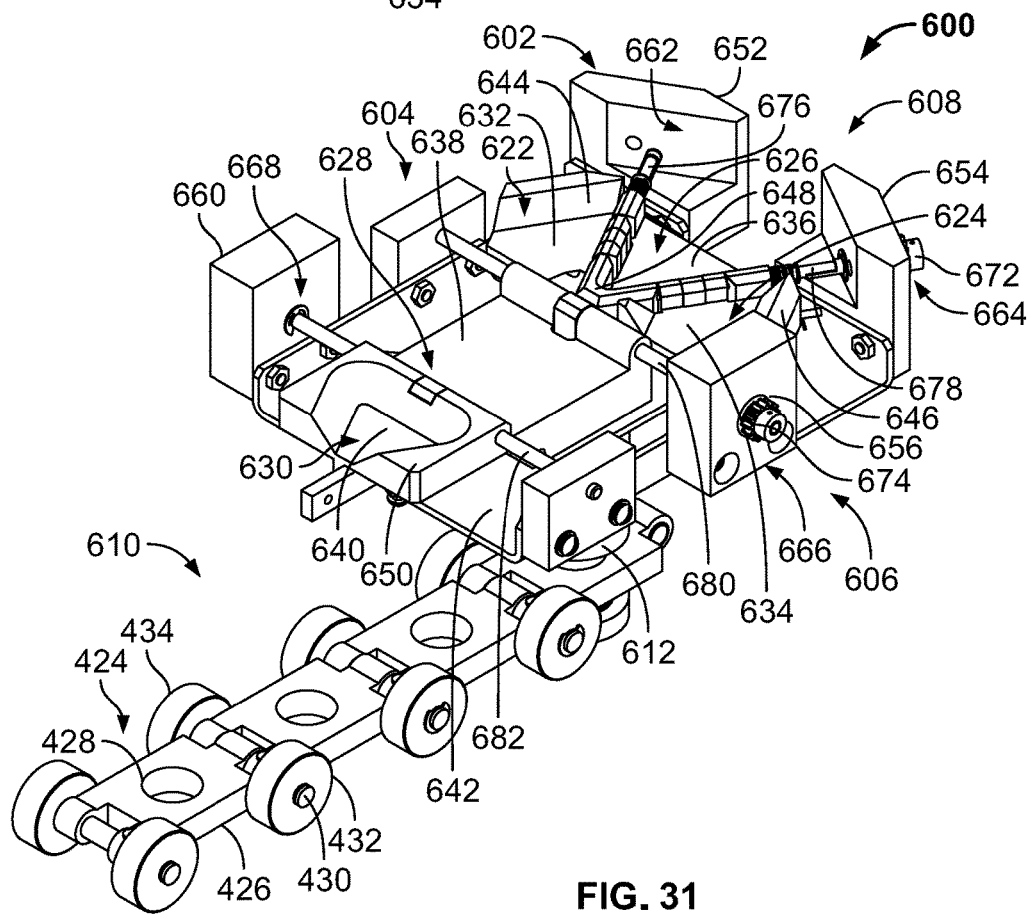
FIG. 31 is a left, rear perspective view of the third example embodiment of FIG. 30.
Figures 32, 33:
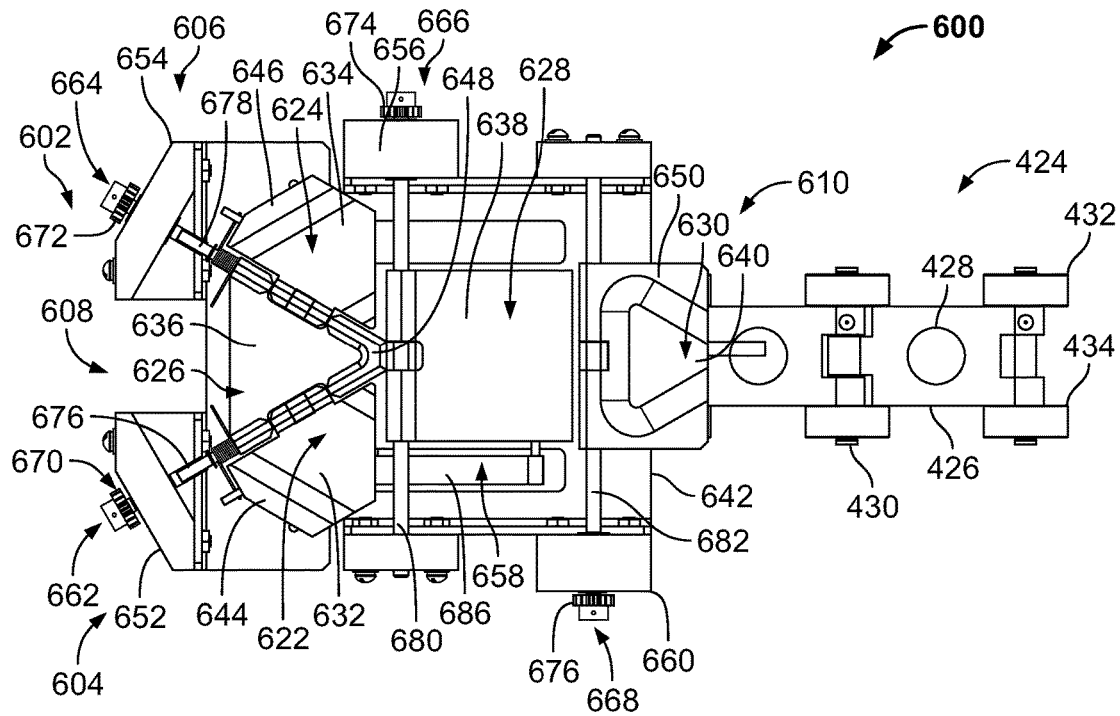
FIG. 32 is a top view of the third example embodiment of FIG. 30.
FIG. 33 is a side view of the third example embodiment of FIG. 30.
Figure 34:
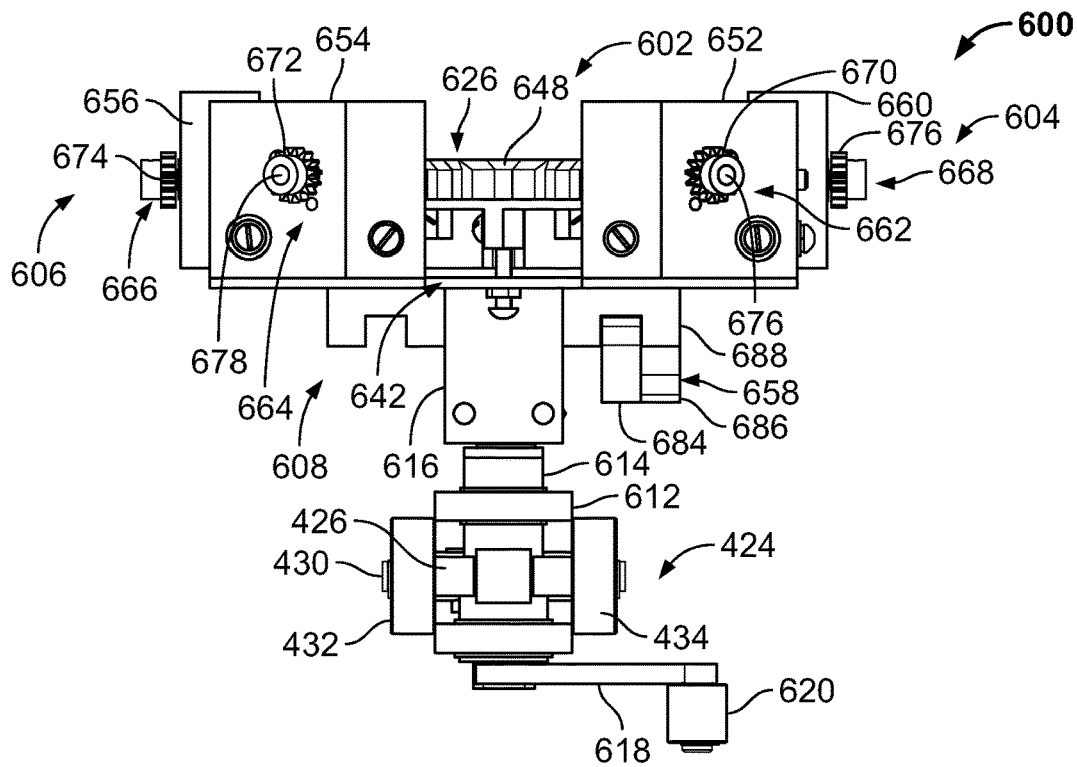
FIG. 34 is a rear view of the third example embodiment of FIG. 30.
Figure 35:
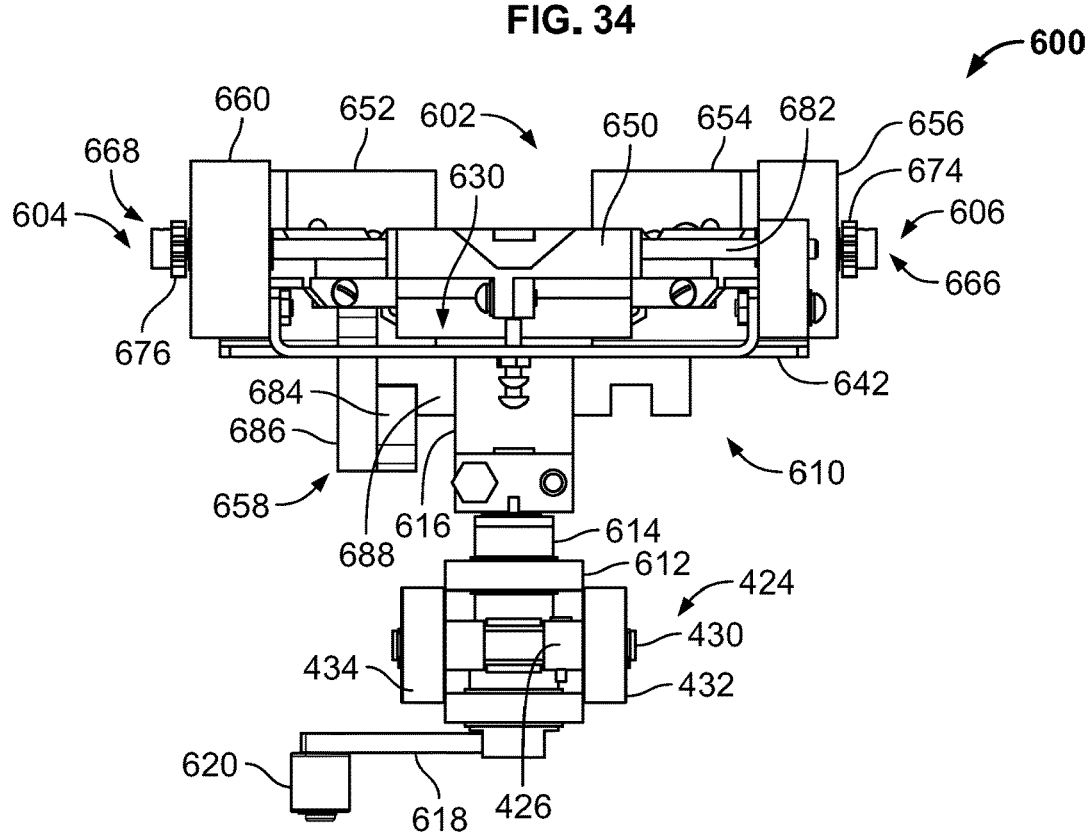
FIG. 35 is a front view of the third example embodiment of FIG. 30.

FIG. 29 is a side view of the apparatus 400 with the platform 448 actuated into a discharge position. While the platform 448 is in the discharge position, the folding platforms 440-446 are in the unfolded position. As shown in FIG. 29, the actuator mechanism 494 has been actuated to translate the track 546 within the actuator block 484 to rotate the gear 544, the track 546 extending from the end of the actuator block 484. Rotation of the gear 544 actuates rotation of the linkages 556-560 which, in turn, pivot the platform 448 into the discharge position. It should be understood that the force of pivoting of the platform 448 slides or propels the folded food product 300 away from the apparatus 400 and into, e.g., a collection container, a conveyor leading to a collection container, or the like.

With reference to FIGS. 30-35, perspective, top, side, rear and front views of a third embodiment of a food product folding apparatus 600 (hereinafter "apparatus 600"), e.g., a triangular food product folding apparatus, are provided. The apparatus 600 includes a folding section 602, a right side actuation section 604 (e.g., a first actuation section) disposed on the right side of the folding section 602, and a left side actuation section 606 (e.g., a second actuation section) disposed on the left side of the folding section 602. The apparatus 600 includes a front end 608 and a rear end 610, with folding of the triangular food product initiating at the front end 608 and ending at or near the rear end 610.

The apparatus 600 includes a base 612 and a support rod 614 connecting the base 612 to the bottom of the folding section 602. The bottom of the folding section 602 includes a mounting flange 616 configured to couple with the support rod 614 to maintain the folding section 602 substantially aligned with horizontal. In some embodiments, coupling of the support rod 614 with the mounting flange 616 can tilt the folding section 602 relative to horizontal. In some embodiments, the apparatus 600 can be coupled to a support surface or transport means, e.g., the conveyor system 424 discussed with respect to apparatus 400. Therefore, similar reference numbers are used to refer to similar structures.

In some embodiments, the apparatus 600 can include an actuator arm 618 fixedly coupled to the bottom end of the support rod 614 and a roller 620 rotatably coupled to the opposing end of the actuator arm 618. The roller 620 can travel along a track (e.g., a track similar to tracks 112, 114), with peaks in the track rotating the folding section 602 relative to the conveyor system 424. For example, in some embodiments, travel of the roller 620 along a peak of a track can rotate the folding section 602 by approximately 90 degrees. The folding section 602 includes a first folding platform 622, a second folding platform 624, a third folding platform 626 (e.g., a flipping platform), a fourth folding platform 628 (e.g., a flipping platform), and a fifth folding platform 630. The folding platforms 622-630 can be operatively mounted to a structural block 642. Using the folding platforms 622-630, a filling deposited on the food product can be completely sealed within the folded food product by creating three folds. In some embodiments, the apparatus 600 can include a discharge mechanism (e.g., a tilt and/or slide plate, a discharge platform similar to discharge platform 448 of the apparatus 400, or the like) for discharging the folded food product from the folding section 602.

The folding platforms 622-630 each include a planar portion 632-640 that defines a planar plate. The planar portions 632-640 can all extend along substantially parallel planes (e.g., planes parallel to horizontal). The planar portions 636, 640 of the folding platforms 626, 630 can define an equilateral triangle, while the planar portion 638 of the folding platform 628 can define a square or rectangular configuration. The folding platforms 622-626, 630 include raised sections 644-650 along one or more perimeter edges of the folding platforms 622-626, 630, resulting in the planar portions 632-636, 640 being recessed relative to the raised sections 644-650. The folding platforms 622, 624 can have raised sections 644, 646 at one corner and the opposing edge, the folding platform 626 can have raised sections 648 at one corner and intermittently along two edges extending from the corner, and the folding platform 630 can have raised sections 650 at three of the perimeter edges. The raised sections 644-650 assist in maintaining the position of the food product during each of the folding steps and accommodate the thickness of the food product as the thickness increases with each fold.

The right side actuation section 604 includes a first actuator block 652, an actuator mechanism 658, and a fifth actuator block 660. The left side actuation section 606 includes a second actuator block 654 and a third actuator block 656. Each of the actuator blocks 652-656, 660 includes an actuator mechanism 662-668. The actuator mechanism 662 can be configured to actuate rotation of the folding platform 622, the actuator mechanism 664 can be configured to actuate rotation of the folding platform 624, the actuator mechanism 666 can be configured to actuate rotation of the folding platform 626, the actuator mechanism 658 can be configured to actuate rotation of the folding platform 628, and the actuator mechanism 668 can be configured to actuate rotation of the folding platform 630.

Each actuator mechanism 662-668 includes a cog or gear 670-674 rotatably mounted to the actuator blocks 652-656, 660 and fixedly coupled to respective actuator shafts or axles 676-682. The axles 676-682 can be rotatably coupled to additional support blocks on opposing sides of the folding section 602. The axles 676-682 can be fixedly coupled to respective folding platforms 622-626,630 such that rotation of the axles 676-682 results in rotation of the folding platforms 622-626, 630. The actuator mechanism 658 includes a linkage assembly configured to rotate the folding platform 628 about axle 680. Particularly, the actuator mechanism 658 includes a linkage 684 rotatably coupled to the bottom of the structural block 642 via a mounting flange 688, and a linkage 686 rotatably coupled at one end to the linkage 684 and rotatably coupled at the opposing end to the folding platform 628. Although shown as a single linkage assembly, in some embodiments, two linkage assemblies can be used on opposing sides of the apparatus 600.

Although not shown, it should be understood that actuation of the actuator mechanisms 662-668, 658 can be in the form of the geared/flange rotation system similar to that of apparatus 100, the rack and pinion system similar to that of apparatus 400, combinations thereof, or the like. Thus, as the apparatus 600 moves along a conveyor system, each of the actuator mechanism 662-668, 658 is sequentially actuated to fold the food product. In particular, actuation of the actuator mechanism 662 results in rotation of the folding platform 622 over the folding platform 626 to make the first fold in the food product. Actuation of the actuator mechanism 664 results in rotation of the folding platform 624 over the folding platform 626 (from the opposite side of the folding platform 622) to make the second fold in the food product.

Actuation of the actuator mechanisms 666, 658 can be either simultaneous or sequential. Actuation of the actuator mechanism 666 results in rotation of the folding platform 626 approximately 90 degrees or more towards the folding platform 628, while actuation of the actuator mechanism 658 results in rotation of the folding platform 628 between approximately 30 to 90 degrees towards the folding platform 626. In some embodiments, the folding platforms 626, 628 can sandwich the partially folded food product therebetween and flip the food product on its opposing side. Particularly, upon rotation of the folding platform 626, the food product is transferred from the folding platform 626 to folding platform 628. In some embodiments, the folding platform 628 is rotated only approximately 45 degrees towards the folding platform 626, and the force of rotation of the folding platform 626 flips or transfers the food product onto the folding platform 628 which is positioned to catch the food product. The folding platform 626 returns to the normal position shown in FIG. 30 and the folding platform 628 returns to the normal position shown in FIG. 30 with the partially folded food product. Actuation of the actuator mechanism 668 results in rotation of the folding platform 630 over the folding platform 628 to make the third and final fold in the food product. The folded food product can subsequently be discharged or removed from the folding platform 628.

Figure 36:
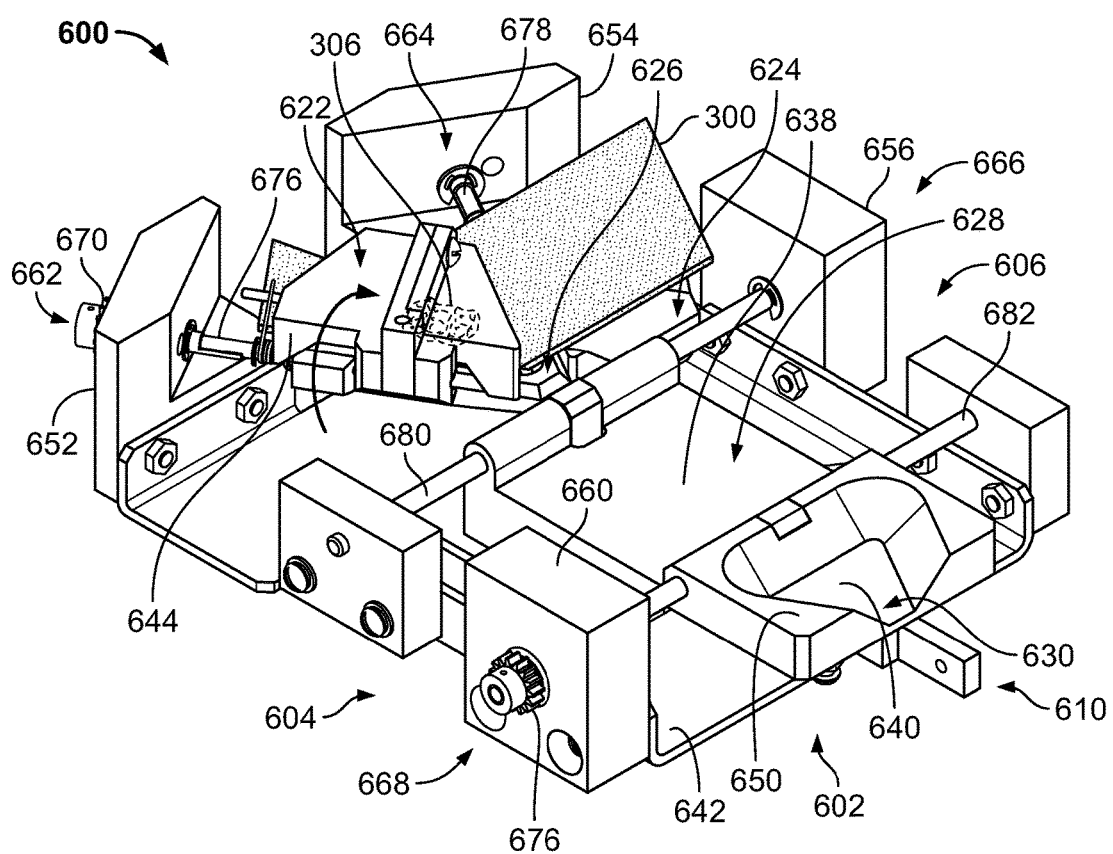
FIG. 36 is a perspective view of the third example embodiment of FIG. 30 including a food product and a first folding platform actuated into a first fold position.

FIG. 36 is a perspective view of the apparatus 600 with a food product 300 disposed on the folding section 602, and the first folding platform 622 actuated into a first fold position. In particular, while the first folding platform 622 is in the fold position, the remaining folding platforms 624-630 are in the unfolded position. Rotation of the gear 670 rotates the first folding platform 622 on top of the third folding platform 626 with the food product 300 sandwiched therebetween. By making the first fold of the food product 300, the food product 300 covers the filling 306.

Figure 37:
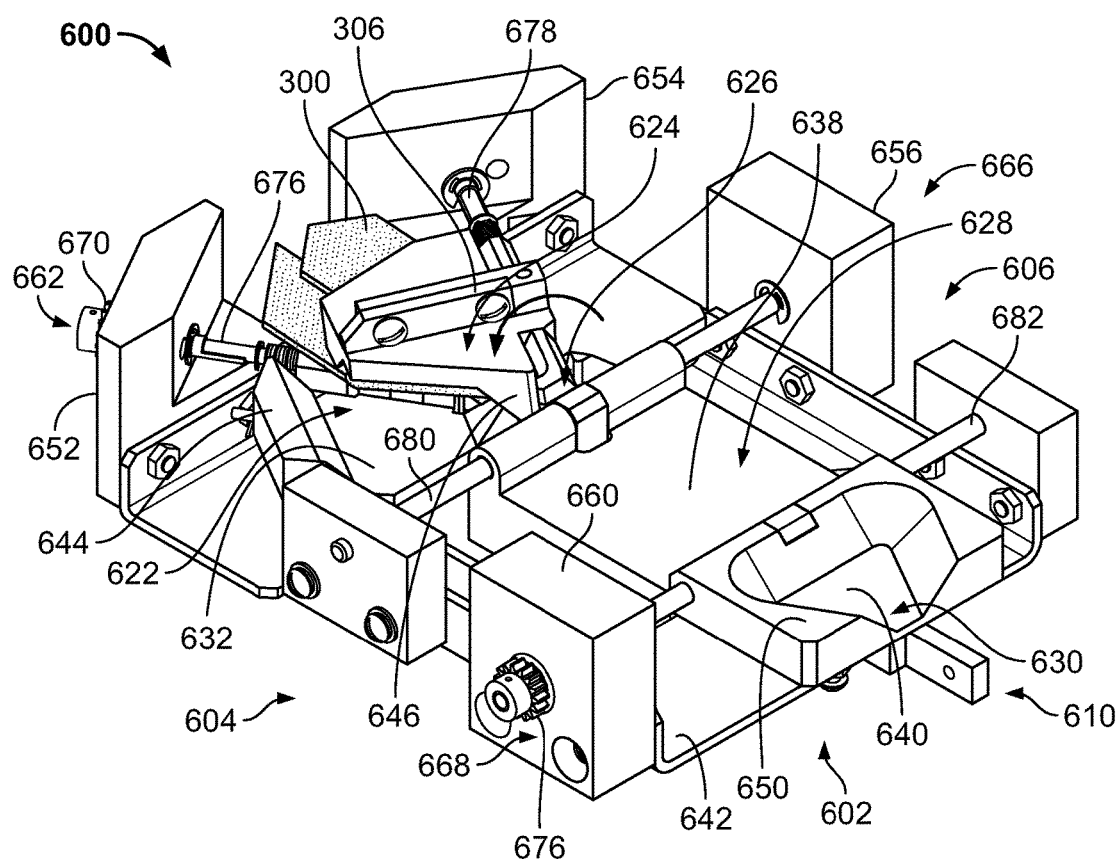
FIG. 37 is a perspective view of the third example embodiment of FIG. 30 including a food product and a second folding platform actuated into a second fold position.

FIG. 37 is a perspective view of the apparatus 600 with the second folding platform 624 actuated into a second fold position. In particular, while the second folding platform 626 is in the fold position, the remaining folding platforms 622, 628, 630 are in the unfolded position. Rotation of the gear 672 rotates the second folding platform 626 on top of the third folding platform 626 with the food product 300 sandwiched therebetween.

Figure 38:
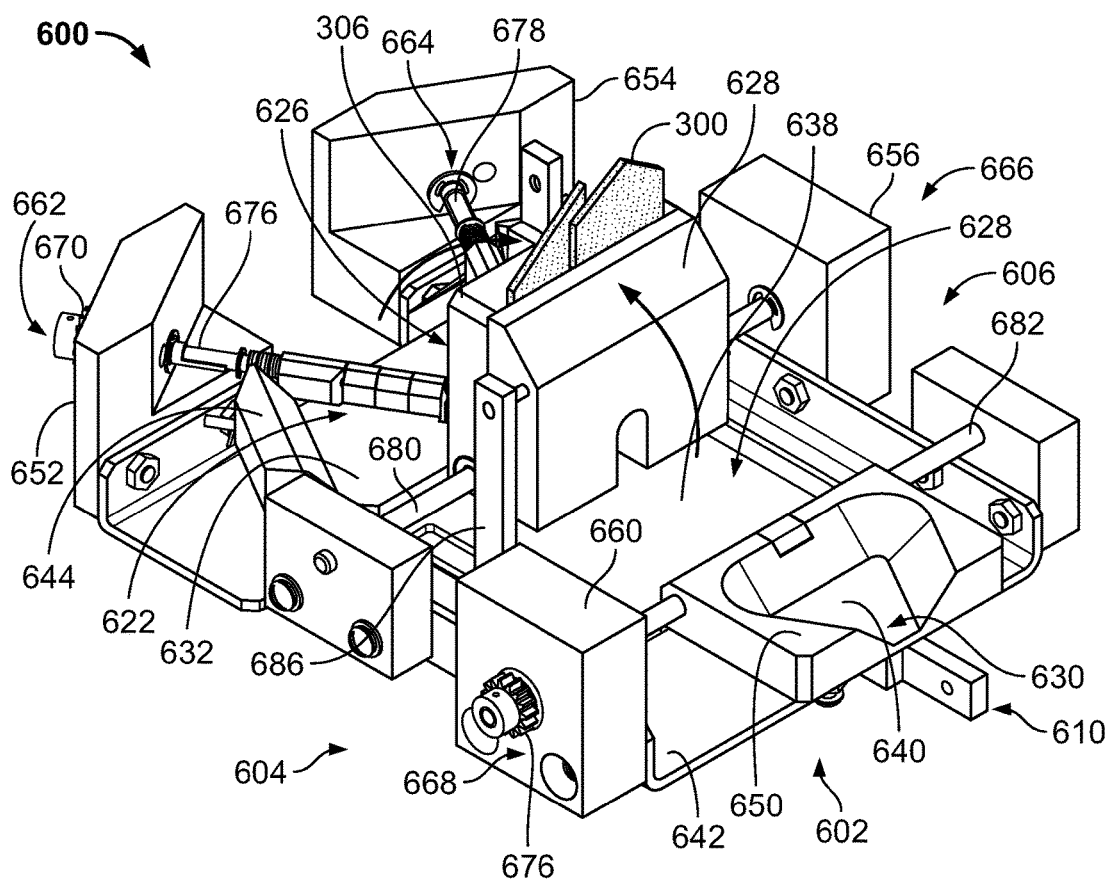
FIG. 38 is a perspective view of the third example embodiment of FIG. 30 including a food product, and a third folding platform and a fourth folding platform actuated into a flipping position.

FIG. 38 is a perspective view of the apparatus 600 with the third and fourth folding platforms 626, 628 actuated into a flipping or transfer position. In particular, while the third and fourth folding platforms 626, 628 are in the flipping or transfer position, the remaining folding platforms 622, 624, 630 are in the unfolded position. Rotation of the gear 674 rotates the third folding platform 626 towards the fourth folding platform 628, and actuation of the actuation mechanism 658 rotates the fourth folding platform 628 towards the third folding platform 626, sandwiching the food product 300 therebetween and transferring the food product 300 from the third folding platform 626 to the fourth folding platform 628. Although shown as being rotated approximately 90 degrees, in some embodiments, the fourth folding platform 628 can be rotated less than 90 degrees (e.g., 30 degrees, 45 degrees, 60 degrees, 75 degrees, or the like) towards the third folding platform 626, with the rotating third folding platform 626 flipping the food product from the third folding platform 626 to the fourth folding platform

628. In such embodiments, the food product is not sandwiched between the third and fourth folding platforms 626, 628.

Figure 39:
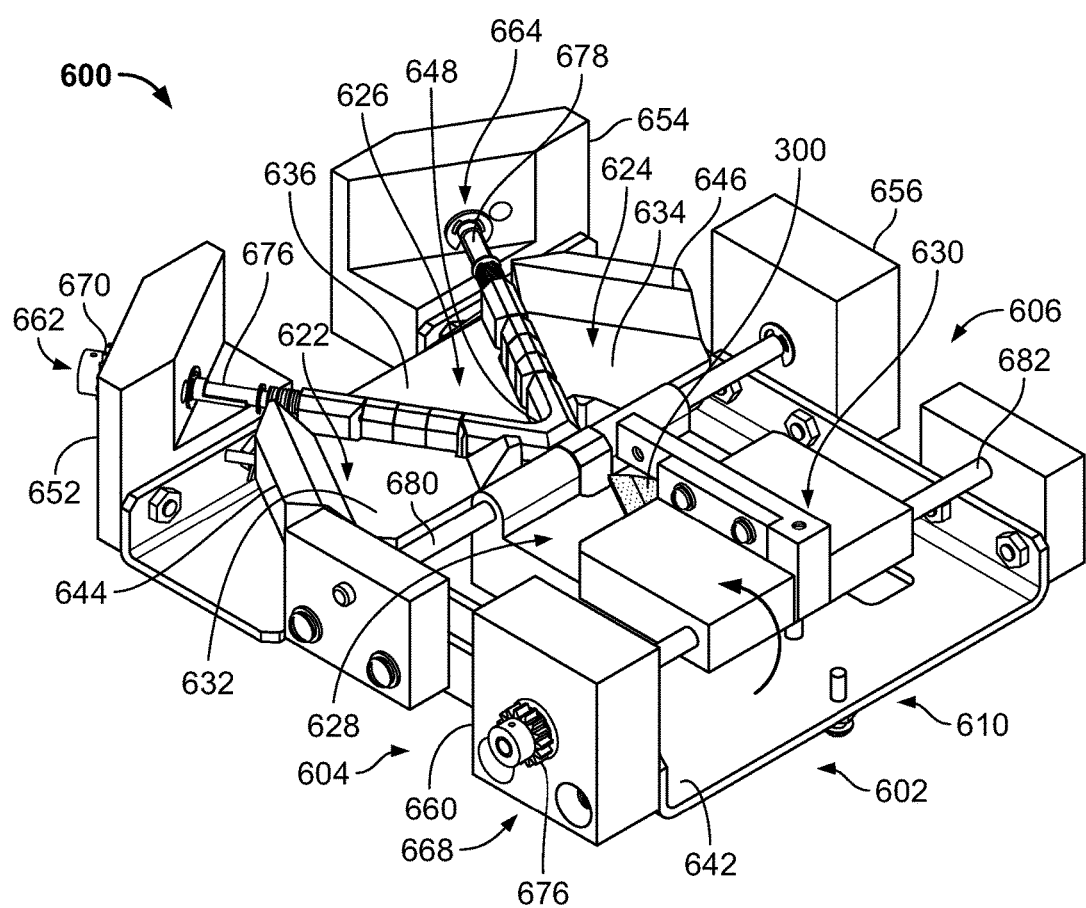
FIG. 39 is a perspective view of the third example embodiment of FIG. 30 including a food product and a fifth folding platform actuated into a third fold position.

FIG. 39 is a perspective view of the apparatus 600 with the fifth folding platform 630 actuated into a third fold position. In particular, while the fifth folding platform 630 is in the fold position, the remaining folding platforms 622-628 are in the unfolded position. Rotation of the gear 676 rotates the fifth folding platform 630 on top of the fourth folding platform 628 with the food product 300 sandwiched therebetween. The fifth folding platform 630 creates the third and final fold to complete folding the food product 300. A discharge mechanism or user can subsequently remove the folded food product 300 from the folding section 602. For example, in some embodiments, the apparatus 600 can include a discharge mechanism (e.g., a tilt and/or slide plate, a discharge platform similar to discharge platform 448 of the apparatus 400, or the like) for elevating and discharging the folded food product from the folding section 602.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. A food product folding apparatus for forming a triangular food product, comprising:
    a folding section including a first folding platform, a second folding platform, a third folding platform, and a fourth folding platform;
    a first actuator mechanism configured to actuate rotation of the first folding platform into a first fold position to create a first fold in a food product;
    a second actuator mechanism configured to actuate rotation of the second folding platform into a second fold position to create a second fold in the folded food product;
    a third actuator mechanism configured to actuate rotation of the third folding platform into a third fold position to create a third fold in the folded food product; and
    a fourth actuator mechanism configured to actuate rotation of the fourth folding platform into a fourth fold position and form the triangular food product.

2. The food product folding apparatus according to claim 1, wherein the first actuator mechanism, the third actuator mechanism and the fourth actuator mechanism are disposed on one side of the folding section, and the second actuator mechanism is disposed on an opposing side of the folding section.

3. The food product folding apparatus according to claim 1, wherein the first, second, third and fourth actuator mechanisms are configured to actuate sequentially to sequentially create the first, second, third and fourth folds of the folded food product.

4. The food product folding apparatus according to claim 1, wherein the first, second, third and fourth folding platforms are staggered in elevation relative to each other to form a vertical space between each of the respective first, second, third and fourth folding platforms.

5. The food product folding apparatus according to claim 1, wherein each of the first, second, third and fourth folding platforms include a planar portion and one or more raised edges.

6. The food product folding apparatus according to claim 5, wherein the planar portion of the first folding platform defines a scalene triangle.

7. The food product folding apparatus according to claim 5, wherein the planar portion of the second, third and fourth folding platforms defines an equilateral triangle.

8. The food product folding apparatus according to claim 1, wherein the folding section comprises a discharge platform and a fifth actuator mechanism configured to actuate rotation of the discharge platform between a dough receiving position and a discharge position.

9. The food product folding apparatus according to claim 8, wherein the discharge platform includes a planar portion and one or more raised sections at corners of the planar portion.

10. The food product folding apparatus according to claim 9, wherein the planar portion and the one or more raised sections of the discharge platform define equilateral triangles.

11. The food product folding apparatus according to claim 1, wherein each of the first, second, third and fourth actuator mechanisms comprises a gear, a geared track engaged with the gear, an actuator bar coupled to the geared track, and a roller rotatably mounted to the actuator bar.

12. The food product folding apparatus according to claim 11, wherein each of the first, second, third and fourth actuator mechanisms comprises a spring assembly biasing the respective first, second, third and fourth folding platforms away from the first, second, third and fourth folding positions.

13. The food product folding apparatus according to claim 1, wherein the folding section is mounted to a structural block disposed below the folding section, and the structural block is secured to a support surface via a support rod.

14. The food product folding apparatus according to claim 13, wherein the folding section is tilted relative to the support surface by an angle between ten degrees and forty degrees with respect to horizontal.

15. A food product folding system for forming a triangular food product, comprising:
    a food product folding apparatus including (i) a folding section including a first folding platform, a second folding platform, a third folding platform and a fourth folding platform, (ii) a first actuator mechanism configured to actuate rotation of the first folding platform into a first fold position to create a first fold of in a food product, (iii) a second actuator mechanism configured to actuate rotation of the second folding platform into a second fold position to create a second fold in the folded food product, (iv) a third actuator mechanism configured to actuate rotation of the third folding platform into a third fold position to create a third fold in the folded food product, and (v) a fourth actuator mechanism configured to actuate rotation of the fourth folding platform into a fourth fold position to create a fourth fold in the folded food product and form the triangular food product;
    a first actuation track disposed on one side of the food product folding apparatus; and
    a second actuation track disposed on an opposing side of the food product folding apparatus,
    wherein the first and second actuation tracks sequentially actuate at least one of the first, second, third and fourth actuator mechanisms as the food product folding apparatus moves along the first and second actuation tracks.

16. The food product folding system according to claim 15, wherein each of the first and second actuation tracks includes peaks and valleys.

17. The food product folding system according to claim 16, wherein the peaks for the first and second actuation tracks actuate the respective first, second, third and fourth folding platforms into the first, second, third and fourth fold positions.

18. A method of forming a triangular food product, comprising:
    positioning a food product on a folding section of a food product folding apparatus, the food product folding apparatus including a first folding platform, a second folding platform, a third folding platform and a fourth folding platform;
    actuating a first actuator mechanism to actuate rotation of the first folding platform into a first fold position to create a first fold in the food product;
    actuating a second actuator mechanism to actuate rotation of the second folding platform into a second fold position to create a second fold in the folded food product;
    actuating a third actuator mechanism to actuate rotation of the third folding platform into a third fold position to create a third fold in the folded food product; and
    actuating a fourth actuator mechanism to actuate rotation of the fourth folding platform into a fourth fold position to create a fourth fold in the folded food product to form the triangular food product.

19. The method according to claim 18, comprising actuating a fifth actuator mechanism to actuate rotation of a discharge platform into a discharge position to discharge the triangular food product from the folding section of the food product folding apparatus.

20. The method according to claim 18, wherein the food product is a sheet of dough configured to be folded into the triangular food product.

21. A food product folding apparatus for forming a triangular food product, comprising:
    a folding section including a first folding platform, a second folding platform, a third folding platform, and a fourth folding platform, wherein the first, second, third and fourth folding platforms are staggered in elevation relative to each other to form a vertical space between each of the respective first, second, third and fourth folding platforms;
    a first actuator mechanism configured to actuate rotation of the first folding platform into a first fold position to create a first fold in a food product;
    a second actuator mechanism configured to actuate rotation of the second folding platform into a second fold position to create a second fold in the folded food product;
    a third actuator mechanism configured to actuate rotation of the third folding platform into a third fold position to create a third fold in the folded food product; and
    a fourth actuator mechanism configured to actuate rotation of the fourth folding platform into a fourth fold position and form the triangular food product.

22. The food product folding apparatus according to claim 21, wherein the first actuator mechanism, the third actuator mechanism and the fourth actuator mechanism are disposed on one side of the folding section, and the second actuator mechanism is disposed on an opposing side of the folding section.

23. The food product folding apparatus according to claim 21, wherein the first, second, third and fourth actuator mechanisms are configured to actuate sequentially to sequentially create the first, second, third and fourth folds of the folded food product.

24. The food product folding apparatus according to claim 21, wherein each of the first, second, third and fourth folding platforms include a planar portion and one or more raised edges.

25. The food product folding apparatus according to claim 24, wherein the planar portion of the first folding platform defines a scalene triangle.

26. The food product folding apparatus according to claim 24, wherein the planar portion of the second, third and fourth folding platforms defines an equilateral triangle.

27. The food product folding apparatus according to claim 21, wherein the folding section comprises a discharge platform and a fifth actuator mechanism configured to actuate rotation of the discharge platform between a dough receiving position and a discharge position.

28. The food product folding apparatus according to claim 27, wherein the discharge platform includes a planar portion and one or more raised sections at corners of the planar portion.

29. The food product folding apparatus according to claim 28, wherein the planar portion and the one or more raised sections of the discharge platform define equilateral triangles.

30. The food product folding apparatus according to claim 21, wherein each of the first, second, third and fourth actuator mechanisms comprises a gear, a geared track engaged with the gear, an actuator bar coupled to the geared track, and a roller rotatably mounted to the actuator bar.

31. The food product folding apparatus according to claim 30, wherein each of the first, second, third and fourth actuator mechanisms comprises a spring assembly biasing the respective first, second, third and fourth folding platforms away from the first, second, third and fourth folding positions.

32. The food product folding apparatus according to claim 21, wherein the folding section is mounted to a structural block disposed below the folding section, and the structural block is secured to a support surface via a support rod.

33. The food product folding apparatus according to claim 32, wherein the folding section is tilted relative to the support surface by an angle between ten degrees and forty degrees with respect to horizontal.

34. A food product folding system for forming a triangular food product, comprising:
    a food product folding apparatus including (i) a folding section including a first folding platform, a second folding platform, a third folding platform, and a fourth folding platform, wherein the first, second, third and fourth folding platforms are staggered in elevation relative to each other to form a vertical space between each of the respective first, second, third and fourth folding platforms, (ii) a first actuator mechanism configured to actuate rotation of the first folding platform into a first fold position to create a first fold of in a food product, (iii) a second actuator mechanism configured to actuate rotation of the second folding platform into a second fold position to create a second fold in the folded food product, (iv) a third actuator mechanism configured to actuate rotation of the third folding platform into a third fold position to create a third fold in the folded food product, and (v) a fourth actuator mechanism configured to actuate rotation of the fourth folding platform into a fourth fold position to create a fourth fold in the folded food product and form the triangular food product;
a first actuation track disposed on one side of the food product folding apparatus; and
a second actuation track disposed on an opposing side of the food product folding apparatus,
wherein the first and second actuation tracks sequentially actuate at least one of the first, second, third and fourth actuator mechanisms as the food product folding apparatus moves along the first and second actuation tracks.

35. The food product folding system according to claim 34, wherein each of the first and second actuation tracks includes peaks and valleys.

36. The food product folding system according to claim 35, wherein the peaks for the first and second actuation tracks actuate the respective first, second, third and fourth folding platforms into the first, second, third and fourth fold positions.

37. A method of forming a triangular food product, comprising:
positioning a food product on a folding section of a food product folding apparatus, the food product folding apparatus including a first folding platform, a second folding platform, a third folding platform, and a fourth folding platform, wherein the first, second, third and fourth folding platforms are staggered in elevation relative to each other to form a vertical space between each of the respective first, second, third and fourth folding platforms;
actuating a first actuator mechanism to actuate rotation of the first folding platform into a first fold position to create a first fold in the food product;
actuating a second actuator mechanism to actuate rotation of the second folding platform into a second fold position to create a second fold in the folded food product;
actuating a third actuator mechanism to actuate rotation of the third folding platform into a third fold position to create a third fold in the folded food product; and
actuating a fourth actuator mechanism to actuate rotation of the fourth folding platform into a fourth fold position to create a fourth fold in the folded food product to form the triangular food product.

38. The method according to claim 37, comprising actuating a fifth actuator mechanism to actuate rotation of a discharge platform into a discharge position to discharge the triangular food product from the folding section of the food product folding apparatus.

39. The method according to claim 37, wherein the food product is a sheet of dough configured to be folded into the triangular food product.

* * * * *